US011999134B2

United States Patent
Kidera et al.

(10) Patent No.: US 11,999,134 B2
(45) Date of Patent: Jun. 4, 2024

(54) LAMINATED GLASS

(71) Applicant: AGC Inc., Tokyo (JP)

(72) Inventors: Nobutaka Kidera, Tokyo (JP); Kazuhiko Niwano, Tokyo (JP); Shoichi Takeuchi, Tokyo (JP); Tetsuo Abe, Tokyo (JP); Yutaka Kuroiwa, Tokyo (JP)

(73) Assignee: AGC INC., Tokyo (JP)

( * ) Notice: Subject to any disclaimer, the term of this patent is extended or adjusted under 35 U.S.C. 154(b) by 41 days.

(21) Appl. No.: 17/874,221

(22) Filed: Jul. 26, 2022

(65) Prior Publication Data

US 2022/0363038 A1  Nov. 17, 2022

Related U.S. Application Data

(63) Continuation of application No. PCT/JP2021/002762, filed on Jan. 27, 2021.

(30) Foreign Application Priority Data

Jan. 30, 2020 (JP) .................... 2020-013822

(51) Int. Cl.
   *B32B 17/10* (2006.01)
   *B32B 3/18* (2006.01)
   (Continued)

(52) U.S. Cl.
   CPC .......... *B32B 17/10449* (2013.01); *B32B 3/18* (2013.01); *B32B 7/023* (2019.01);
   (Continued)

(58) Field of Classification Search
   CPC ......... B32B 17/00–17/1099; B32B 7/00–7/14; B60J 1/00–1/2097
   See application file for complete search history.

(56) References Cited

U.S. PATENT DOCUMENTS

2004/0234778 A1* 11/2004 Fukatani ........... B32B 17/10165
                                                          428/441
2019/0061481 A1* 2/2019 Kagaya ..................... B60J 1/00

FOREIGN PATENT DOCUMENTS

GB  2 271 139 A   4/1994
JP  H05-330864 A  12/1993
(Continued)

OTHER PUBLICATIONS

International Searching Authority, "International Search Report," issued in connection with International Patent Application No. PCT/JP2021/002762, dated Apr. 20, 2021.

(Continued)

*Primary Examiner* — Prashant J Khatri
(74) *Attorney, Agent, or Firm* — Foley & Lardner LLP

(57) ABSTRACT

A laminated glass according to an embodiment of the present invention includes a first glass plate, a second glass plate, and an interlayer film held between the first glass plate and the second glass plate. When a relative dielectric constant of the first glass plate is represented by $\varepsilon_{g1}$; a relative dielectric constant of the second glass plate is represented by $\varepsilon_{g2}$; a relative dielectric constant of a first interlayer film provided in a first region of the interlayer film is represented by $\varepsilon_{m1}$; a reflection coefficient at an interface between the first glass plate and the first interlayer film is represented by $\Gamma_1$; and a reflection coefficient at an interface between the second glass plate and the first interlayer film is represented by $\Gamma_2$, the reflection coefficients $\Gamma_1$ and $\Gamma_2$ satisfy relations $0.0 \leq \Gamma_1 \leq 0.2$ and $0.0 \leq \Gamma_2 \leq 0.2$.

15 Claims, 14 Drawing Sheets

(51) Int. Cl.
 *B32B 7/023* (2019.01)
 *B32B 7/025* (2019.01)
(52) U.S. Cl.
 CPC ........ *B32B 7/025* (2019.01); *B32B 17/10036* (2013.01); *B32B 17/10614* (2013.01); *B32B 2250/03* (2013.01); *B32B 2250/40* (2013.01); *B32B 2264/1021* (2020.08); *B32B 2264/1022* (2020.08); *B32B 2264/1023* (2020.08); *B32B 2264/501* (2020.08); *B32B 2307/204* (2013.01); *B32B 2307/416* (2013.01); *B32B 2307/42* (2013.01); *B32B 2605/00* (2013.01)

(56) References Cited

FOREIGN PATENT DOCUMENTS

| | | |
|---|---|---|
| JP | 2011-502090 A | 1/2011 |
| JP | 2019-214129 A | 12/2019 |
| WO | WO-2009/030476 A1 | 3/2009 |
| WO | WO-2017/188415 A1 | 11/2017 |

OTHER PUBLICATIONS

International Searching Authority, "Written Opinion," issued in connection with International Patent Application No. PCT/JP2021/002762, dated Apr. 20, 2021.

\* cited by examiner

LAMINATED GLASS

INCORPORATION BY REFERENCE

This application is a continuation of PCT Application No. PCT/JP2021/002762, filed on Jan. 27, 2021, which is based upon and claims the benefit of priority from Japanese patent application No. 2020-013822, filed on Jan. 30, 2020, the disclosure of which is incorporated herein in its entirety by reference.

BACKGROUND

The present invention relates to a laminated glass, and in particular, to a laminated glass for vehicle.

In recent years, in addition to communications in wavelength ranges using microwaves or millimeter waves, infrastructures for high-speed and large-capacity communications such as communications in conformity with 4G, LTE and 5G have been expanding, so there is a trend that frequency bands to be used are expanding from a 3 GHz band to a 5 to 100 GHz band. Although, for example, when a millimeter-wave radar installed inside a vehicle performs transmission and reception, attenuation of electromagnetic waves, which occurs due to the vehicle's window glass, has not been noticeable in communications in conventional frequency bands (e.g., up to the 3 GHz), this attenuation becomes a problem in the above-described expanded frequency bands.

As a technique for solving the above-described problem, International Patent Publication No. WO2017/188415 discloses a configuration in which a part of a window glass, in particular, a part of a laminated glass for vehicle, is replaced by an electromagnetic wave transmission material, i.e., the electromagnetic wave transmission material is fitted into the part of the window glass. That is, International Patent Publication No. WO2017/188415 discloses a configuration in which, in a laminated glass including two layers of glass and an interlayer film held therebetween, an electromagnetic wave transmission material is provided in a part of the laminated glass from which at least a part of the inner-side glass (i.e., the glass located inside the vehicle) is removed, so that the transmitting property of the window member for electromagnetic waves transmitted or received by the millimeter-wave radar is improved.

Further, Published Japanese Translation of PCT International Publication for Patent Application, No. 2011-502090 discloses a glass pane by which sensitivity for detecting an electromagnetic radiation can be improved. In the glass pane disclosed in Published Japanese Translation of PCT International Publication for Patent Application, No. 2011-502090, a hole is formed in a part of an inner pane of a composite glass pane (a laminated glass), so that sensitivity for detecting an electromagnetic radiation that passes through this hole is improved.

SUMMARY

However, when a part of a glass is removed and an electromagnetic wave transmission material is provided in this part, where the glass is removed, in order to increase the transmitting property for electromagnetic waves transmitted or received by a millimeter-wave radar as in the case of the window member in International Patent Publication No. WO2017/188415, there is a problem that the manufacturing process becomes complicated.

Further, in the case where a hole is formed in a part of an inner pane of a composite glass (a laminated glass) as in Published Japanese Translation of PCT International Publication for Patent Application, No. 2011-502090, there is a problem that since the part of the inner pane is removed, the glass strength required for the composite glass pane (the laminated glass) is lowered.

In view of the above-described problems, an object of the present invention is to provide a laminated glass that improves the transmitting property for electromagnetic waves in the millimeter-wave band and satisfies the strength required for the ordinary laminated glass.

A laminated glass according to an embodiment of the present invention comprises a first glass plate, a second glass plate, and an interlayer film held between the first and second glass plates, in which when a predetermined frequency between 60 GHz and 100 GHz is represented by F [GHz]; a relative dielectric constant of the first glass plate at the frequency F is represented by $\varepsilon_{g1}$; a relative dielectric constant of the second glass plate at the frequency F is represented by $\varepsilon_{g2}$; a relative dielectric constant of a first interlayer film provided in a first region of the interlayer film is represented by $\varepsilon_{m1}$; a reflection coefficient at an interface between the first glass plate and the first interlayer film when an electromagnetic wave having the frequency F is incident on the laminated glass is represented by $\Gamma_i$; and a reflection coefficient at an interface between the second glass plate and the first interlayer film when the electromagnetic wave having the frequency F is incident on the laminated glass is represented by $\Gamma_2$, below-shown relations are satisfied:

$$\Gamma_1 = \frac{|\sqrt{\varepsilon_{g1}} - \sqrt{\varepsilon_{m1}}|}{\sqrt{\varepsilon_{g1}} + \sqrt{\varepsilon_{m1}}} \quad \Gamma_2 = \frac{|\sqrt{\varepsilon_{g2}} - \sqrt{\varepsilon_{m1}}|}{\sqrt{\varepsilon_{g2}} + \sqrt{\varepsilon_{m1}}}$$

and $0.0 \leq \Gamma_1 \leq 0.2$; and $0.0 \leq \Gamma_2 \leq 0.2$.

In a plan view of the first glass plate of the laminated glass, the relative dielectric constant of the first interlayer film at the frequency F may satisfy below-shown relations:

$0.0 \leq |\varepsilon_{g1} - \varepsilon_{m1}|/\varepsilon_{g1} \leq 0.6$; and $0.0 \leq |\varepsilon_{g2} - \varepsilon_{m1}|/\varepsilon_{g2} \leq 0.6$.

In the above-described laminated glass, the interlayer film includes the first region and a second region in a plan view of the first glass plate, and when a relative dielectric constant of a second interlayer film provided in the second region at the frequency F is represented by $\varepsilon_{m2}$, below-shown relations are satisfied:

$\varepsilon_{m2} \neq \varepsilon_{m1}$, and $|\varepsilon_{g1} - \varepsilon_{m2}|/\varepsilon_{g1} > 0.6$; and $|\varepsilon_{g2} - \varepsilon_{m2}|/\varepsilon_{g2} > 0.6$.

In the above-described laminated glass, the relative dielectric constants $\varepsilon_{m1}$ and $\varepsilon_{m2}$ may satisfy a relation $\varepsilon_{m1} \geq \varepsilon_{m2}$.

In the above-described laminated glass, the relative dielectric constants $\varepsilon_{m1}$ and $\varepsilon_{m2}$ may satisfy a relation $\varepsilon_{m1} - \varepsilon_{m2} \geq 1.5$.

In the above-described laminated glass, the second interlayer film may contain at least one type selected from the group consisting of polyvinyl butyral, ethylene vinyl acetate, a cycloolefin polymer, an urethane resin, a fluorine resin, a fluoro-rubber, a polyimide resin, a liquid-crystal polymer, a bismaleimide triazine resin, a polyphenylene ether, a polyether terephthalate, an acrylic resin such as a polymethyl methacrylate resin, a silicone resin, an ABS resin, $Al_2O_3$, and $SiO_2$.

In the above-described laminated glass, the relative dielectric constants $\varepsilon_{g1}$, $\varepsilon_{g2}$ and $\varepsilon_{m1}$ may satisfy below-shown relations:

$$\varepsilon_{g1} - \varepsilon_{m1} \leq 3.5; \text{ and}$$

$$\varepsilon_{g2} - \varepsilon_{m1} \leq 3.5.$$

In the above-described laminated glass, a transmittance of the first interlayer film for visible light may be 70% or higher.

In the above-described laminated glass, when an electromagnetic wave having the frequency F is incident on the first glass plate at an incident angle θ no smaller than 30° and no larger than 90° (30°≤θ≤90°), the relative dielectric constant $\varepsilon_{m1}$ of the first interlayer film may satisfy a relation $3 \leq \varepsilon_{m1} \leq 15$.

In the above-described laminated glass, the frequency F may be in a range of 70 GHz to 84 GHz.

In the above-described laminated glass, the interlayer film may contain at least one type selected from the group consisting of polyvinyl butyral, ethylene vinyl acetate, a cycloolefin polymer, an urethane resin, and a polyvinylidene fluoride resin (PVDF).

In the above-described laminated glass, the first interlayer film may contain at least one type selected from the group consisting of $Al_2O_3$, $TiO_2$, $SiO_2$, $ZrO_2$, YSZ, $SnO_2$, forsterite, cordierite, steatite, barium magnesium-acid niobate, barium neodymium titanate, lead zirconate titanate (PZT), borosilicate glass, non-alkali glass, glass fiber, soda lime glass, phosphate glass, $BaTiO_3$, $SrTiO_3$, $BaSrTiO_3$, aluminum nitride, and $MnO_2$.

In the above-described laminated glass, the first interlayer film may contain $Al_2O_3$, and a volume content of $Al_2O_3$ may be larger than 1.8 vol %.

In the above-described laminated glass, the first interlayer film may contain $TiO_2$, and a volume content of $TiO_2$ may be in a range of 0.15 to 3.4 vol %.

In the above-described laminated glass, the first interlayer film may contain $SiO_2$, and a volume content of $SiO_2$ may be 10 vol % or larger.

In the above-described laminated glass, the first interlayer film may contain a powdery glass, the powdery glass, when expressed by mol percentages based on oxides, satisfying:

$SiO_2$: 50%-85%
$B_2O_3$: 0%-35%
$Al_2O_3$: 0%-25%
$Li_2O + Na_2O + K_2O$: 0%-30%
MgO: 0%-15%
CaO: 0%-15%
SrO: 0%-15%
BaO: 0%-15%
$ZrO_2$: 0%-5%
$TiO_2$: 0%-10%
$Fe_2O_3$: 0%-5%
$SnO_2$: 0%-5%, and
a volume content of the powdery glass may be not smaller than 1 vol % and not larger than 50 vol %.

In the above-described laminated glass, the first interlayer film may contain $BaTiO_3$, and a volume content of the $BaTiO_3$ may be not smaller than 1 vol % and not larger than 50 vol %.

According to the present invention, it is possible to provide a laminated glass that improves the transmitting property for electromagnetic waves in the millimeter-wave band and satisfies the strength required for the ordinary laminated glass.

DESCRIPTION OF EMBODIMENTS

Embodiments according to the present invention will be described hereinafter with reference to the drawings.

Figure 1:
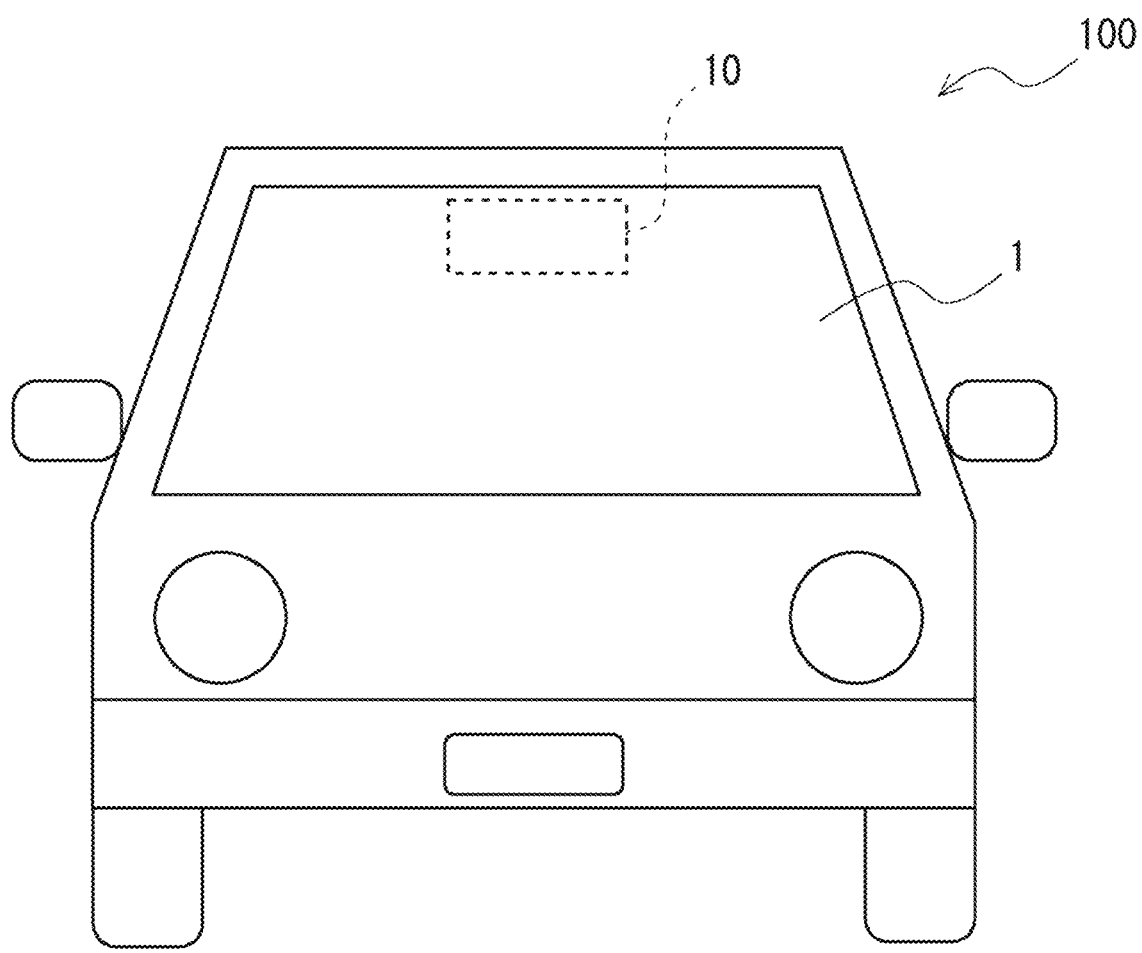
FIG. 1 shows a vehicle equipped with a laminated glass according to an embodiment.

FIG. 1 shows a vehicle equipped with a laminated glass according to an embodiment. As shown in FIG. 1, the laminated glass 1 according to this embodiment is typically used for the windshield of a vehicle 100 such as an automobile. However, the use of the laminated glass 1 according to this embodiment is not limited to the windshield of the vehicle 100. That is, the laminated glass 1 may be used for a rear glass attached to the rear of the vehicle 100, a side glass attached to a side of the vehicle 100, or a roof glass attached to the roof of the vehicle 100.

The vehicle 100 includes an information device for ensuring the safety of traveling of the vehicle 100. Such an information device is housed in, for example, a housing (a case) 10 provided on the inner side, i.e., the vehicle-interior side, of the laminated glass (the windshield) 1. Note that although the housing (the case) 10 is disposed at the center of the upper part of the laminated glass in FIG. 1, the housing may be disposed in other parts thereof.

Note that the information device, which is a device for detecting a vehicle, a pedestrian, an obstacle, etc. in front of the own vehicle by using a millimeter-wave radar or the like, may include, for example, in addition or instead of the millimeter-wave radar, a stereo camera, an infrared laser, or the like. Further, the information device may include a communication apparatus capable of performing high-speed and large-capacity communications such as communications in conformity with 4G, LTE or 5G. For example, an antenna(s) for communication may be housed in the housing (the case) 10.

In this embodiment, the information device is configured so as to be able to transmit and/or receive electromagnetic waves (signals) in a millimeter-wave band. Therefore, in this embodiment, it is possible to increase the transmitting property for electromagnetic waves in the millimeter-wave band at least at a part of the laminated glass 1 corresponding to the housing (the case) 10. In this embodiment, the millimeter-wave band means a band from 30 GHz to 300 GHz, and the effects of the present invention become particularly noticeable in a band from 60 GHz to 100 GHz.

Figure 2A:
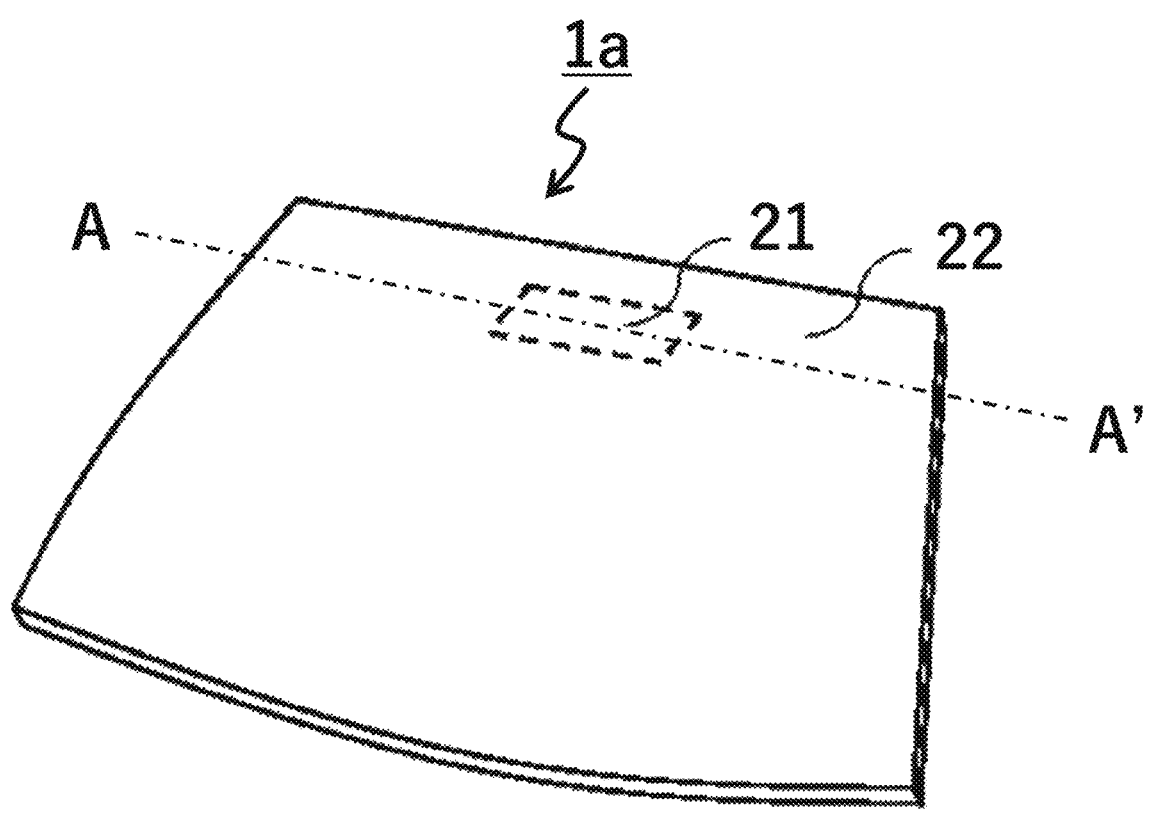
FIG. 2A is a perspective view of a laminated glass according to an embodiment.
Figure 2B:
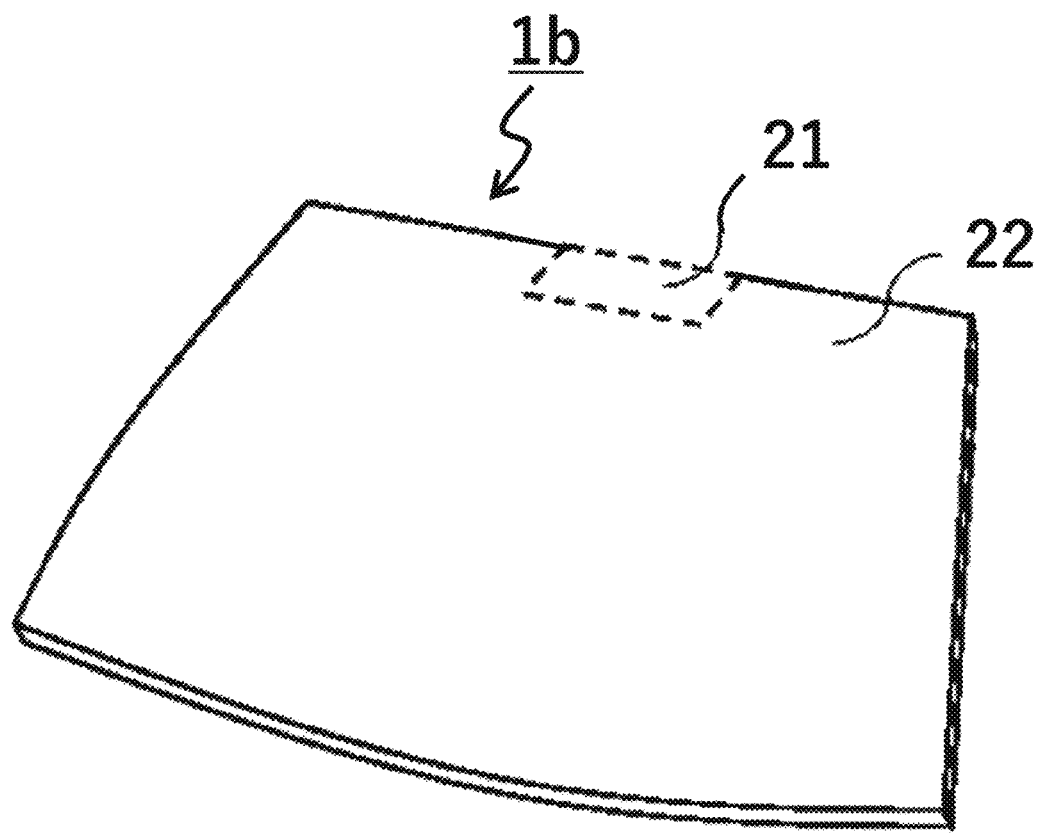
FIG. 2B is a perspective view of a laminated glass according to an embodiment.

Each of FIGS. 2A and 2B is a perspective view of the laminated glass (the windshield) 1 shown in FIG. 1, and they are referred to as a laminated glass 1a and a laminated glass 1b, respectively. The laminated glass 1a shown in FIG. 2A is an example in which a first region 21 is a region on the upper side in the plan view of the laminated glass 1a, and the outer edge of the first region 21 is positioned inside the outer edge of the laminated glass 1a. Further, the laminated glass 1b shown in FIG. 2B is an example in which a first region 21 is a region on the upper side in the plan view of the laminated glass 1b, and a part of the outer edge of the first region 21 (the upper side in this example) is positioned so as to coincide with a part of the outer edge of the laminated glass 1b (the upper side in this example). Note that the upper side means a side that is positioned on the upper side when the laminated glass 1a or 1b is attached to the vehicle.

The structure of the laminated glass 1 (1a or 1b) in the first region 21 thereof will be described hereinafter. Note that the first region 21 may be the entire region of the laminated glass 1 (1a or 1b) as will be described later, and in such a case, the laminated glass 1 includes no second region 22.

Figure 3:
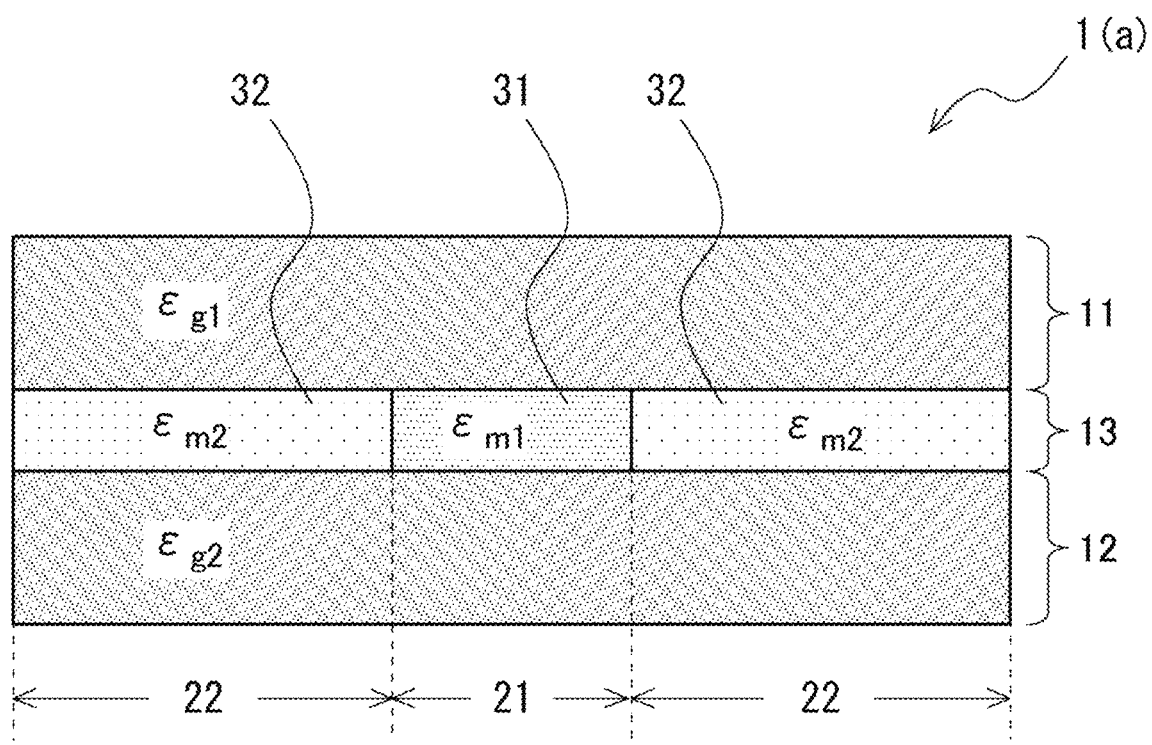
FIG. 3 is a cross-sectional view of a laminated glass according to an embodiment.

FIG. 3 is a cross-sectional view of the laminated glass according to this embodiment, and is a cross-sectional view of the laminated glass 1a shown in FIG. 2A, taken along a chain line A-A' in FIG. 2A. As shown in FIG. 3, the laminated glass 1 according to this embodiment includes a first glass plate 11, a second glass plate 12, and an interlayer film 13 held between the first and second glass plates 11 and 12. That is, the first and second glass plates 11 and 12 are bonded to each other with the interlayer film 13 interposed therebetween.

The first and second glass plates 11 and 12 are manufactured by using, for example, a float method, a fusion method, or the like, but the manufacturing method is not limited to these methods. Further, the laminated glass 1 according to this embodiment is obtained, at a temperature of about 70° C. to 110° C., by stacking the first glass plate 11, the interlayer film 13, and the second glass plate 12 in this order, placing them in a vacuum bag such as a rubber bag, connecting this vacuum bag to a discharging system, and sucking the gas contained in the vacuum bag (i.e., degassing the vacuum bag) so that the pressure inside the vacuum bag decreases to a decompressed pressure of about −65 kPa to −100 kPa (an absolute pressure). Further, for example, by performing a crimping process by heating and pressurizing the laminated glass at a temperature of about 100° C. to 140° C. and at a pressure of 0.6 MPa to 1.3 MPa, a laminated glass having better durability can be obtained. Note that the manufacturing method is not limited to this method.

Further, when the laminated glass 1 is used for, for example, a head-up display (HUD), at least one of the first glass plate 11, a first interlayer film 31, and the second glass plate 12 may not have a uniform thickness, and the thickness of each part thereof may be changed as required. For example, when the laminated glass 1 is used as a windshield, either or both of the first and second glass plates 11 and 12 may have a wedge shape in cross section in which the thickness of the glass plate gradually increases from the lower side toward the upper side in the state in which the windshield is mounted in the vehicle. In such a case, when the thickness of the first interlayer film 31 is uniform, the total wedge angle of the first and second glass plates 11 and 12 may be changed, for example, within a range of larger than 0 mrad and no larger than 1.0 mrad. Further, when the laminated glass 1 is used for, for example, a HUD, the first interlayer film 31 may have a wedge shape in cross section in which the thickness of the first interlayer film 31 gradually increases from the lower side toward the upper side in the state in which the windshield is mounted in the vehicle. In such a case, when the thickness of each of the first and second glass plates 11 and 12 is uniform, the total wedge angle of the first interlayer film 31 may be changed, for example, within a range of larger than 0 mrad and no larger than 1.0 mrad.

Examples of the composition of at least one of the first and second glass plates 11 and 12 used in this embodiment include a glass of which the composition, when expressed by mol percentages based on oxides, satisfies the below-shown relation. Examples of the glass include, but are not limited to, a glass containing $SiO_2$ in an amount of 50% to 80%, $B_2O_3$ in an amount of 0% to 10%, $Al_2O_3$ in an amount of 0.1% to 25%, at least one type of an alkali metal oxide selected from the group consisting of $Li_2O$, $Na_2O$ and $K_2O$ in a total amount of 3% to 30%, MgO in an amount of 0% to 25%, CaO in an amount of 0% to 25%, SrO in an amount of 0% to 5%, BaO in an amount of 0% to 5%, $ZrO_2$ in an amount of 0% to 5%, $Fe_2O_3$ in an amount of 0% to 5%, and $SnO_2$ in an amount of 0% to 5%.

Examples of the composition of at least one of the first and second glass plates 11 and 12 used in this embodiment also include a glass of which the composition, when expressed by mol percentages based on oxides, satisfies the below-shown relation:

$50 \leq SiO_2 \leq 85$ $0 \leq Al_2O_3 \leq 20$ $4 \leq R_2O \leq 22$ ($R_2O$ represents the total amount of alkali metal oxides)

$0 \leq RO \leq 20$ (RO represents the total amount of MgO, CaO, SrO and BaO)

$0 \leq Na_2O/R_2O \leq 0.8$ $0 \leq K_2O/R_2O \leq 0.7$.

Further, examples of the composition of at least one of the first and second glass plates 11 and 12 used in this embodiment also include a glass of which the composition, when expressed by mol percentages based on oxides, satisfies the below-shown relation:

$72 \leq SiO_2 + Al_2O_3 + B_2O_3 \leq 98$ $55 \leq SiO_2 \leq 87$ $0 \leq Al_2O_3 \leq 20$ $0 \leq B_2O_3 \leq 25$ $0 \leq R_2O \leq 5$ ($R_2O$ represents the total amount of alkali metal oxides)

$0 \leq RO \leq 20$ (RO represents the total amount of MgO, CaO, SrO and BaO).

Further, in the laminated glass 1a shown in FIG. 3, the interlayer film 13 includes a first interlayer film 31 disposed in the first region 21 and a second interlayer film 32 disposed in the second region 22.

The first interlayer film 31 is made of a material having a relative dielectric constant $\varepsilon_{m1}$, and the second interlayer film 32 is made of a material having a relative dielectric constant $\varepsilon_{m2}$.

For the interlayer film 13, a material containing, for example, polyvinyl butyral (PVB), ethylene vinyl acetate (EVA), a cycloolefin polymer, a urethane resin, a polyvinylidene fluoride resin (PVDF), or the like can be used. Further, a thermosetting resin which is in a liquid state before being heated may be used. That is, the interlayer film 13 needs to be a layered state only when the laminated glass 1 is formed, and the interlayer film 13 may be, for example, in a liquid state before the first and second glass plates 11 and 12 are bonded. Note that details of the interlayer film 13 will be described later.

A specific configuration of the laminated glass 1 according to this embodiment and a result of a simulation thereof will be described hereinafter in detail.

As shown in FIG. 3, the laminated glass 1 according to this embodiment includes the first glass plate 11, the second glass plate 12, and the interlayer film 13 held between the first and second glass plates 11 and 12. Here, a predetermined frequency between 60 GHz and 100 GHz is represented by F [GHz]; a relative dielectric constant of the first glass plate at the frequency F is represented by $\varepsilon_{g1}$; a relative dielectric constant of the second glass plate at the frequency F is represented by $\varepsilon_{g2}$; a relative dielectric constant of the first interlayer film 31 is represented by $\varepsilon_{m1}$; a reflection coefficient at an interface between the first glass plate 11 and the first interlayer film 31 when an electromagnetic wave having the frequency F is incident thereon is represented by $\Gamma_1$; and a reflection coefficient at an interface between the second glass plate 12 and the first interlayer film 31 when the electromagnetic wave having the frequency F is incident thereon is represented by $\Gamma_2$. Then, the laminated glass 1 according to this embodiment satisfies the below-shown Expressions 1 to 3.

$$\Gamma_1 = \frac{|\sqrt{\varepsilon_{g1}} - \sqrt{\varepsilon_{m1}}|}{\sqrt{\varepsilon_{g1}} + \sqrt{\varepsilon_{m1}}} \quad \Gamma_2 = \frac{|\sqrt{\varepsilon_{g2}} - \sqrt{\varepsilon_{m1}}|}{\sqrt{\varepsilon_{g2}} + \sqrt{\varepsilon_{m1}}} \quad \text{Expression 1}$$

$$0.0 \leq \Gamma_1 \leq 0.2 \quad \text{Expression 2}$$

$$0.0 \leq \Gamma_2 \leq 0.2. \quad \text{Expression 3}$$

In this embodiment, it is possible to reduce the difference between the relative dielectric constant of the first glass plate 11 and that of the first interlayer film 31, and the difference between the relative dielectric constant of the second glass plate 12 and that of the first interlayer film 31 by adjusting the relative dielectric constant of each of elements constituting the laminated glass 1 according to the above-described relations. When the difference between the relative dielectric constants of the first and second glass plates 11 and 12 and that of the interlayer film 13 (the first interlayer film 31) is reduced, the reflection at the interface between the first and second glass plates 11 and 12 and the interlayer film 13 (the first interlayer film 31) can be suppressed (i.e., reduced), so that the transmitting property for electromagnetic waves in the millimeter-wave band can be improved. Further, the difference between the relative dielectric constant of the first glass plate 11 and that of the first interlayer film 31, and the difference between the relative dielectric constant of the second glass plate 12 and that of the first interlayer film 31 may each be 0.15 or lower, and is preferably 0.12 or lower, more preferably 0.09 or lower, still more preferably 0.06 or lower, particularly preferably 0.03 or lower, and most preferably 0.01 or lower.

Further, in this embodiment, there is no need to remove any part of each of the elements constituting the laminated glass 1, especially any part of the first and second glass plates 11 and 12, so that the strength required for the ordinary laminated glass can be satisfied. That is, since the laminated glass 1 according to this embodiment has a three-layer structure composed of the first glass plate 11, the second glass plate 12, and the interlayer film 13, the strength required for the ordinary laminated glass can be satisfied.

Note that the first region 21 corresponds to, in the plan view of the first glass plate 11, a region including at least a part corresponding to the housing 10 (see FIG. 1) in which the information device is housed. Further, specifically, the laminated glass 1 may include the first interlayer film 31 having the configuration according to this embodiment at least at a part corresponding to the housing 10 (see FIG. 1), i.e., at a part at which millimeter-wave radar travels through the window glass 1 (i.e., the first region 21). The interlayer film disposed in regions other than the region including the part corresponding to the housing 10 may be the first interlayer film 31 or a second interlayer film, and can be formed as desired.

Further, in this embodiment, the relative dielectric constant of the first interlayer film 31 at the frequency F in the first region 21 in the plan view of the first glass plate 11 may satisfy the below-shown Expressions 4 and 5. By satisfying such conditions, the transmitting property for electromagnetic waves in the millimeter-wave band can be improved.

$$0.0 \leq |\varepsilon_{g1} - \varepsilon_{m1}|/\varepsilon_{g1} \leq 0.6 \quad \text{Expression 4}$$

$$0.0 \leq |\varepsilon_{g2} - \varepsilon_{m1}|/\varepsilon_{g2} \leq 0.6 \quad \text{Expression 5}$$

Further, in this embodiment, the relative dielectric constant $\varepsilon_{g1}$ of the first glass plate 11, the relative dielectric constant $\varepsilon_{g2}$ of the second glass plate 12, and the relative dielectric constant $\varepsilon_{m1}$ of the first interlayer film 31 may satisfy the below-shown Expressions 6 and 7. By satisfying such conditions, the transmitting property for electromagnetic waves in the millimeter-wave band can be improved.

$$\varepsilon_{g1} - \varepsilon_{m1} \leq 3.5 \qquad \text{Expression 6}$$

$$\varepsilon_{g2} - \varepsilon_{m1} \leq 3.5 \qquad \text{Expression 7}$$

Further, the transmittance of the first interlayer film 31 for visible light may be 70% or higher. By satisfying such conditions, the transmitting property for electromagnetic waves in the millimeter-wave band in the first region 21 is improved and the transmittance for visible light therein is also improved. In particular, in the case where an image-pickup apparatus that takes images of the outside of the vehicle is provided inside the housing 10, it is desirable that the transmittance of the first interlayer film for visible light be high. Note that the transmittance of the first interlayer film for visible light is preferably 75% or higher, more preferably 80% or higher, still more preferably 85% or higher, and most preferably 90% or higher.

Further, the first interlayer film 31 may be made of a material of which the dielectric loss tangent (tan δ) at the frequency F is 0.01 or smaller. By the above-described configuration, the transmitting property for electromagnetic waves in the millimeter-wave band in the first region 21 can be further improved. Further, the dielectric loss tangent of the first interlayer film 31 at the frequency F is preferably 0.008 or smaller, more preferably 0.005 or smaller, still more preferably 0.003 or smaller, and particularly preferably 0.001 or smaller.

Further, the first and second glass plates 11 and 12 may be made of a material of which the dielectric loss tangent (tan δ) is at the frequency F is 0.025 or smaller. By the above-described configuration, the transmitting property for electromagnetic waves in the millimeter-wave band in the first region 21 can be further improved. Further, the dielectric loss tangent of the first and second glass plates 11 and 12 at the frequency F is preferably 0.020 or smaller, more preferably 0.018 or smaller, still more preferably 0.015 or smaller, and particularly preferably 0.012 or smaller.

Further, the first and second glass plates 11 and 12 may be made of a material of which the relative dielectric constant at the frequency F is 3.5 or higher. By the above-described configuration, the transmitting property for electromagnetic waves in the millimeter-wave band in the first region 21 can be further improved. Further, the dielectric constant of the first and second glass plates 11 and 12 at the frequency F is preferably 4.5 or higher, more preferably 5.5 or higher, and still more preferably 6.0 or higher. On the other hand, when the relative dielectric constant of the first and second glass plates 11 and 12 is too high, the reflection of electromagnetic waves having the frequency F increases and hence the transmitting property therefor decreases. Therefore, the relative dielectric constant of the first and second glass plates 11 and 12 may be 8.0 or smaller, and is preferably 7.0 or smaller, more preferably 6.5 or smaller, and still more preferably 6.1 or smaller.

In the first interlayer film 31, when an electromagnetic wave having the frequency F is incident on the first glass plate 11 at an incident angle θ (θ is in a range of 30°≤θ≤90°), the relative dielectric constant $\varepsilon_{m1}$ of the first interlayer film 31 may satisfy a relation $3 \leq \varepsilon_{m1} \leq 15$. For example, when an electromagnetic wave in the millimeter-wave range travels in the horizontal direction from an apparatus that is attached to the housing 10 and emits the millimeter-wave radar, it is preferable that the relative dielectric constant $\varepsilon_{m1}$ in a range in which the incident angle θ on the windshield is in a range of 30°≤θ≤90° satisfies the above-described range. Further, the relative dielectric constant $\varepsilon_{m1}$ in a range in which the incident angle θ is in a range of 40°≤θ≤80° may satisfy the above-described range; the relative dielectric constant $\varepsilon_{m1}$ in a range in which the incident angle θ is in a range of 50°≤θ≤75° may satisfy the above-described range; or the relative dielectric constant $\varepsilon_{m1}$ in a range in which the incident angle θ is in a range of 60°≤θ≤75° may satisfy the above-described range.

Further, in this embodiment, the frequency F may be, for example, in a range of 60 GHz to 100 GHz, in a range of 70 GHz to 84 GHz, in a range of 74 GHz to 82 GHz, in a range of 77 GHz to 81 GHz, or in a range of 78.5 GHz to 79.5 GHz. More specifically, the frequency F may be 79 GHz.

Further, in this embodiment, the first interlayer film 31 may contain at least one type selected from the group consisting of, in addition to polyvinyl butyral, ethylene vinyl acetate, a cycloolefin polymer, and an urethane resin, a fluorine resin such as polytetrafluoroethylene (PTFE), ethylene tetrafluoroethylene (ETFE), perfluoroalkoxyalkane (PFA), and polyvinylidene fluoride (PVDF), a fluoro-rubber, a polyimide resin, a liquid-crystal polymer (LCP), a bismaleimide triazine resin, a polyphenylene ether (PPE), a polyether terephthalate (PET), an acrylic resin such as a polymethyl methacrylate resin, a silicone resin, an ABS resin, $Al_2O_3$, and $SiO_2$.

Further, in this embodiment, the first interlayer film 31 may contain an adhesive or a pressure-sensitive adhesive. For example, the first interlayer film 31 may be one in which an adhesive or a pressure-sensitive adhesive is disposed on at least one of the main surfaces of the first interlayer film 31 that is brought into contact with the first glass plate 11 and the main surface thereof that is brought into contact with the second glass plate 12. For example, the adhesive layer that is included in the first interlayer film 31 and is brought into contact with at least one of the first and second glass plates 11 and 12 may be one that is obtained as a photo-curable resin composition, a thermosetting resin composition, a photo-and-thermo curable resin composition, or the like is cured. The "photo-curable resin composition" means a resin composition that can be cured by exposure to light. The "thermosetting resin composition" means a resin composition that can be cured by heating. The "photo-and-thermo curable resin composition" means a resin composition that can be cured by exposure to light and heating.

Further, the relative dielectric constant of the first interlayer film 31 may be adjusted by including (i.e., adding) a filler having a high dielectric constant in the resin material. For example, the first interlayer film 31 may be obtained by including (i.e., adding), in polyvinyl butyral, ethylenevinyl acetate or the like, as a filler, at least one type selected from the group consisting of $Al_2O_3$, $TiO_2$, $SiO_2$, $ZrO_2$, YSZ (Yttria-Stabilized Zirconia), $SnO_2$, forsterite, cordierite, steatite, barium magnesium-acid niobate, barium neodymium titanate, lead zirconate titanate (PZT), (powdery) borosilicate glass, (powdery) non-alkali glass, glass fiber (E glass, D glass, NE glass, etc.), (powdery) soda lime glass, (powdery) phosphate glass, $BaTiO_3$, $SrTiO_3$, $BaSrTiO_3$, aluminum nitride, and $MnO_2$.

For example, when the first interlayer film 31 contains powdery $Al_2O_3$, the volume content of $Al_2O_3$ may be 1.8 vol % or larger, and is preferably 2.3 vol % or larger, and more preferably 3.0 vol % or larger. Depending on the (resin) material as the main component of the first interlayer film 31, if the volume content of $Al_2O_3$ is smaller than 1.8 vol %, it is difficult to increase the relative dielectric constant $\varepsilon_{m1}$ of the (filler-containing) first interlayer film 31.

Further, when the first interlayer film 31 contains powdery $TiO_2$, the volume content of $TiO_2$ may be 0.15 vol % or larger, and is preferably 0.20 vol % or larger, and more preferably 0.30 vol % or larger. Depending on the (resin) material as the main component of the first interlayer film 31, if the volume content of $TiO_2$ is smaller than 0.15 vol %, it is difficult to increase the relative dielectric constant $\varepsilon_{m1}$ of the (filler-containing) first interlayer film 31. Further, depending on the (resin) material as the main component of the first interlayer film 31, the volume content of $TiO_2$ may be 3.4 vol % or smaller, and is preferably 3.0 vol % or smaller, and more preferably 2.5 vol % or smaller. If the volume content of $TiO_2$ is larger than 3.4 vol %, the dielectric constant $\varepsilon_{m1}$ of the first interlayer film 31 becomes too high, and hence there is a possibility that the reflection at the interface between the first interlayer film 31 and the glass plate 11 and/or at the interface between the first interlayer film 31 and the glass plate 12 could increase.

Further, when the first interlayer film 31 contains powdery $SiO_2$, the volume content of $SiO_2$ may be 10 vol % or larger, and is preferably vol % or larger, and more preferably 30 vol % or larger. Depending on the (resin) material as the main component of the first interlayer film 31, if the volume content of $SiO_2$ is smaller than 10 vol %, it is difficult to increase the relative dielectric constant $\varepsilon_{m1}$ of the (filler-containing) first interlayer film 31.

Further, when the first interlayer film 31 contains powdery glass, the first interlayer film 31, when expressed by mol percentages based on oxides, satisfies:
  $SiO_2$: 50%-85%
  $B_2O_3$: 0%-35%
  $Al_2O_3$: 0%-25%
  $Li_2O+Na_2O+K_2O$: 0%-30%
  MgO: 0%-15%
  CaO: 0%-15%
  SrO: 0%-15%
  BaO: 0%-15%
  $ZrO_2$: 0%-5%
  $TiO_2$: 0%-10%
  $Fe_2O_3$: 0%-5%
  $SnO_2$: 0%-5%, and under the above-described conditions, the volume content of the powdery glass can be adjusted within a range of no smaller than 1 vol % and no larger than 50 vol %. Depending on the (resin) material as the main component of the first interlayer film 31, if the volume content of the powdery glass is smaller than 1 vol %, it is difficult to increase the relative dielectric constant $\varepsilon_{m1}$ of the (filler-containing) first interlayer film 31. Further, when the volume content of the powdery glass exceeds 50 vol %, the first interlayer film 31 is likely to become brittle.

Further, when the first interlayer film 31 contains powdery glass, it may be a glass that, when expressed by mol percentages based on oxides, satisfies:
  $SiO_2$: 60%-85%
  $B_2O_3$: 0%-15%
  $Al_2O_3$: 0%-10%
  $Li_2O+Na_2O+K_2O$: 0%-20%
  MgO: 0%-10%
  CaO: 0%-10%
  SrO: 0%-10%
  BaO: 0%-10%
  $ZrO_2$: 0%-3%
  $TiO_2$: 0%-5%
  $Fe_2O_3$: 0%-2%
  $SnO_2$: 0%-3%, and under the above-described conditions, the volume content of the powdery glass can also be adjusted within a range of no smaller than 1 vol % and no larger than 50 vol %.

Further, when the first interlayer film 31 contains $BaTiO_3$ (powder), the volume content of the powdery $BaTiO_3$ can be adjusted within a range of no smaller than 10 vol % and no larger than 50 vol %. Depending on the (resin) material as the main component of the first interlayer film 31, if the volume content of the powdery $BaTiO_3$ is smaller than 1 vol %, it is difficult to increase the relative dielectric constant $\varepsilon_{m1}$ of the (filler-containing) first interlayer film 31. Further, when the volume content of the powdery $BaTiO_3$ exceeds 50 vol %, the first interlayer film 31 is likely to become brittle.

Further, the shape of the above-described filler is not limited to any particular shapes, and examples of the shape include common shapes of powders, such as spherical, a crushed shape (a block shape), a flat shape, and columnar. However, the shape of the filler is not limited to the aforementioned shapes, and may be a short fibrous (chop-strand) shape, a long fibrous shape, an ultrathin fibrous shape, a hollow fibrous shape, or a glass cloth shape. For example, when the filler is spherical, its size may be 100 μmφ or smaller.

Further, when the interlayer film 13 includes the first and second regions 21 and 22 in the plan view of the first glass plate 11, the relative dielectric constant $\varepsilon_{m2}$ of the second interlayer film 32 disposed in the second region 22 at the frequency F may not be equal to the relative dielectric constant $\varepsilon_{m1}$ ($\varepsilon_{m2} \neq \varepsilon_{m1}$), and may satisfy the below-shown Expressions 8 and 9. Note that the term "plan view" means a view of the laminated glass 1 when it is viewed in the thickness direction thereof.

$$|\varepsilon_{g1}-\varepsilon_{m2}|/\varepsilon_{g1} > 0.6 \qquad \text{Expression 8}$$

$$|\varepsilon_{g2}-\varepsilon_{m2}|/\varepsilon_{g2} > 0.6 \qquad \text{Expression 9}$$

Further, in this embodiment, the relative dielectric constants $\varepsilon_{m1}$ and $\varepsilon_{m2}$ of the first and second interlayer films 31 and 32 may satisfy a relation $\varepsilon_{m1} > \varepsilon_{m2}$. Further, in this embodiment, the relative dielectric constants $\varepsilon_{m1}$ and $\varepsilon_{m2}$ of the first and second interlayer films 31 and 32 may satisfy a relation $\varepsilon_{m1}-\varepsilon_{m2} \geq 1.5$, a relation $\varepsilon_{m1}-\varepsilon_{m2} \geq 2.0$, a relation $\varepsilon_{m1}-\varepsilon_{m2} \geq 2.5$, a relation $\varepsilon_{m1}-\varepsilon_{m2} \geq 3.0$, or a relation $\varepsilon_{m1}-\varepsilon_{m2} \geq 3.5$. By adjusting the relative dielectric constants $\varepsilon_{m1}$ and $\varepsilon_{m2}$ of the first and second interlayer films 31 and 32 so as to satisfy the above-described conditions as described above, it is possible to selectively increase the transmitting property for electromagnetic waves in the millimeter-wave band in the first region of the laminated glass.

In this embodiment, the second interlayer film 32 may contain at least one type selected from the group consisting of polyvinyl butyral, ethylene vinyl acetate, a cycloolefin polymer, a urethane resin, and a polyvinylidene fluoride resin (PVDF).

Note that, in this embodiment, as described above, the dielectric constant of the interlayer film 13 may be adjusted to the relative dielectric constant $\varepsilon_{m1}$ over the entire area of the laminated glass (the windshield) 1 shown in FIG. 1. In other words, the interlayer film 13 of the laminated glass (the windshield) 1 shown in FIG. 1 may be entirely formed of the first interlayer film 31.

In this embodiment, the thickness of each of the first and second glass plates 11 and 12 may be 1.1 mm or larger in order to ensure the strength thereof, and is preferably 1.5 mm or larger, and more preferably 1.8 mm or larger. Further, although the upper limit of the thickness of each of the first and second glass plates 11 and 12 is not limited to any particular thicknesses, the upper limit of the thickness is preferably 3.0 mm or smaller under the normal circumstances because the weight of the glass plate increases as it becomes thicker.

Further, for the easiness of handling, the thickness of the interlayer film 13 is preferably 0.3 mm or larger, more preferably 0.5 mm or larger, and still more preferably 0.7 mm or larger. Further, for reducing the weight, the thickness of the interlayer film 13 is preferably 2.3 mm or smaller, more preferably 2.0 mm or smaller, and still more preferably 1.0 mm or smaller.

(Results of Simulations)

Figure 4:
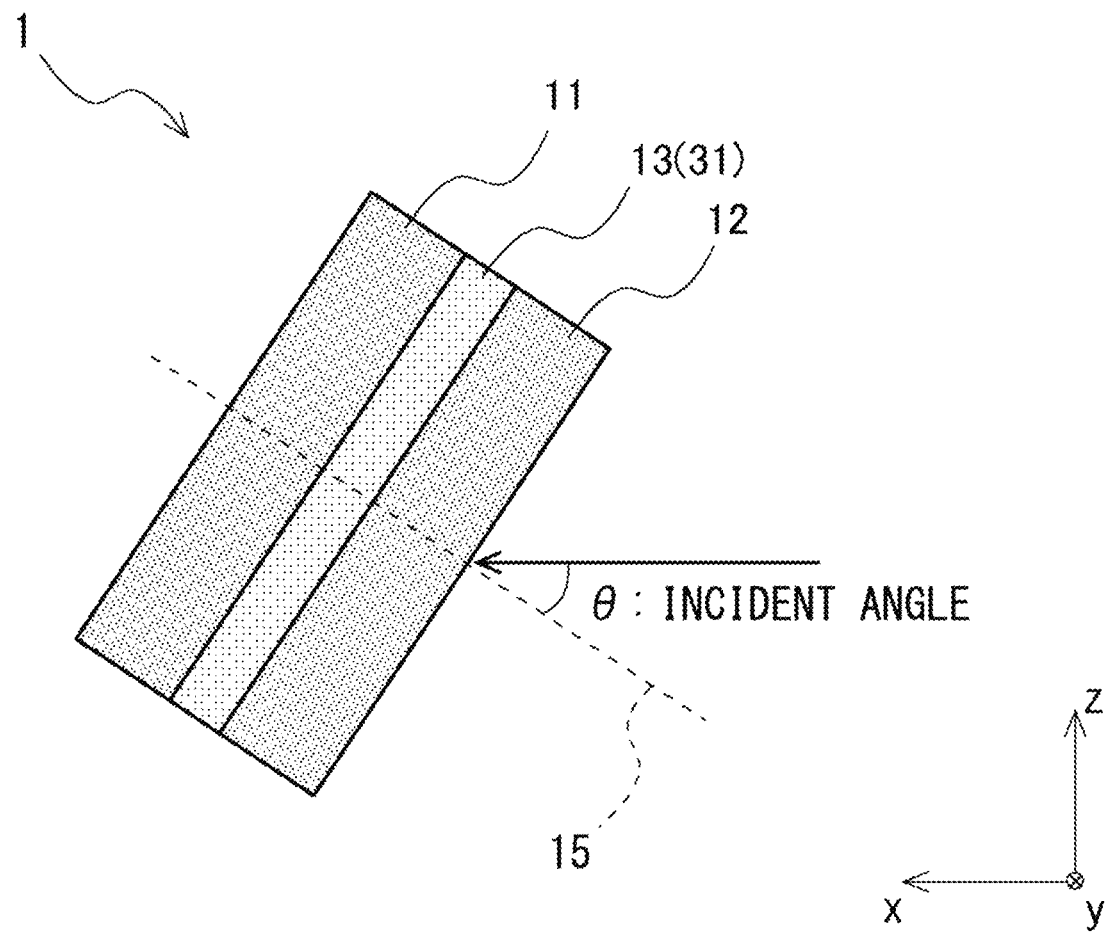
FIG. 4 is a cross-sectional view for explaining an incident angle θ of an electromagnetic wave incident on a laminated glass.
Figure 5:
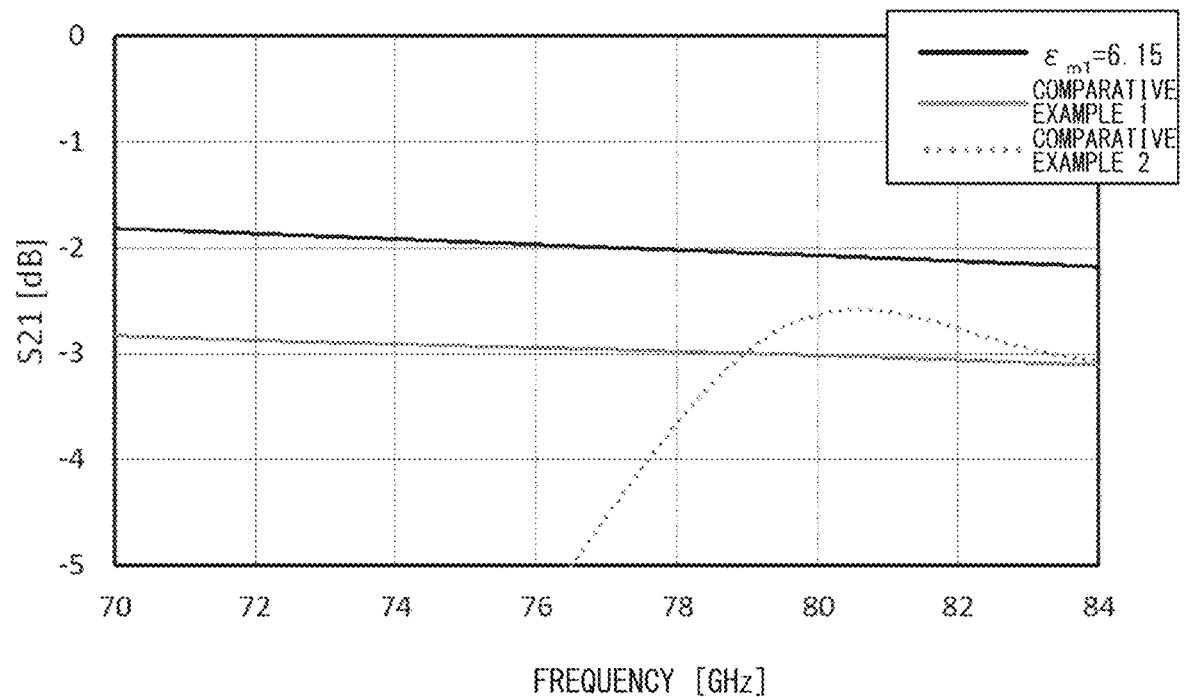
FIG. 5 is a graph showing results of simulations of electromagnetic wave transmission characteristics of laminated glasses.

Next, results of simulations of laminated glasses 1 according to this embodiment will be described. FIG. 4 is a cross-sectional view for explaining an incident angle θ of an electromagnetic wave incident on a laminated glass. As shown in FIG. 4, the incident angle θ is an angle between a line segment 15 orthogonal to the main surface of the laminated glass and the traveling direction of the electromagnetic wave (the x-axis direction). Note that although the laminated glass 1 shown in FIG. 4 is drawn as a schematic diagram in which only the first region 21 is shown, the laminated glass 1 may include a second region 22 (not shown). FIG. 5 is a graph showing results of simulations of electromagnetic wave transmission characteristics of laminated glasses. The conditions of the simulations shown in FIG. 5 are as follows.

In an Example 1, the relative dielectric constant of the first interlayer film 31 in FIG. 3 was set to 6.15 ($\varepsilon_{m1}$=6.15). The relative dielectric constant of the first interlayer film 31 of each of Comparative Examples 1 and 2 was set to 2.45 ($\varepsilon_{m1}$=2.45). Further, the relative dielectric constant of the first glass plate 11 was set to 6.72 ($\varepsilon_{g1}$=6.72), and the relative dielectric constant of the second glass plate 12 was set to 6.72 ($\varepsilon_{g2}$=6.72). Note that each of the relative dielectric constants is a relative dielectric constant at a frequency F of 79 GHz (F=79 GHz). The thickness of each of the first and second glass plates 11 and 12 was set to 2 mm, and the thickness of the first interlayer film 31 was set to 0.76 mm. The frequency range of electromagnetic waves in the millimeter-wave range in the simulations was set to 70 GHz to 84 GHz.

In the conditions of the simulations shown in FIG. 5, the incident angle θ of the electromagnetic wave in the Example 1 was set to 67.5° (θ=67.5°). The incidence angle θ of the Comparative Example 1 was set to 67.5° (θ=67.5°), and the incidence angle θ of the Comparative Example 2 was set to 0° (θ=00), i.e., it was normal incidence on the main surface of the laminated glass 1. Further, in the below-shown results of the simulations (FIGS. 5 to 12), vertically polarized waves were used as the electromagnetic waves incident on the laminated glass 1. Specifically, the vertically polarized wave is a polarized wave (a TM wave) of which the direction of the electric-field component coincides with the z-axis direction in the cross-sectional view shown in FIG. 4. Note that, in the cross-sectional view shown in FIG. 4, the horizontally polarized wave is a polarized wave (a TE wave) of which the direction of the electric-field component coincides with the y-axis direction.

FIG. 5 shows results of simulations of the transmission characteristics (S21) of electromagnetic waves under above-described conditions. Note that, in the results of the simulations of the electromagnetic wave transmission characteristics, the higher the value of the transmission characteristic S21 [dB] is, the better the transmitting property for electromagnetic waves are.

As shown in FIG. 5, when the relative dielectric constant of the first interlayer film 31 was set to 2.45 ($\varepsilon_{m1}$=2.45) (Comparative Example 1), the electromagnetic wave transmission characteristic was about −3 dB. Meanwhile, when the relative dielectric constant of the first interlayer film 31 was set to 6.15 ($\varepsilon_{m1}$=6.15) (Example 1), the electromagnetic wave transmission characteristic was about −2 dB, indicating that the transmitting property for electromagnetic waves was improved. Therefore, the electromagnetic wave transmission characteristic was better when the relative dielectric constant of the interlayer film 13 was 6.15 ($\varepsilon_{m1}$=6.15) than when the relative dielectric constant was 2.45 ($\varepsilon_{m1}$=2.45).

That is, when the relative dielectric constant of the first interlayer film 31 is 6.15 ($\varepsilon_{m1}$=6.15), the relative dielectric constant of the first interlayer film 31 is close to those of the first and second glass plates 11 and 12 ($\varepsilon_{g1}$, $\varepsilon_{g2}$: 6.72). Therefore, it is possible to reduce the reflection at the interfaces between the first and second glass plates 11 and 12 and the first interlayer film 31, and thereby to improve the transmitting property for electromagnetic waves in the millimeter-wave band. Note that, in the Comparative Example 2 in which the incident angle θ was 0° (θ=0°), the electromagnetic wave transmission characteristic fluctuated according to the frequency of the electromagnetic wave, and the electromagnetic wave transmission characteristic was −4 dB or lower in the range of 70 GHz to 77 GHz.

Figure 6:
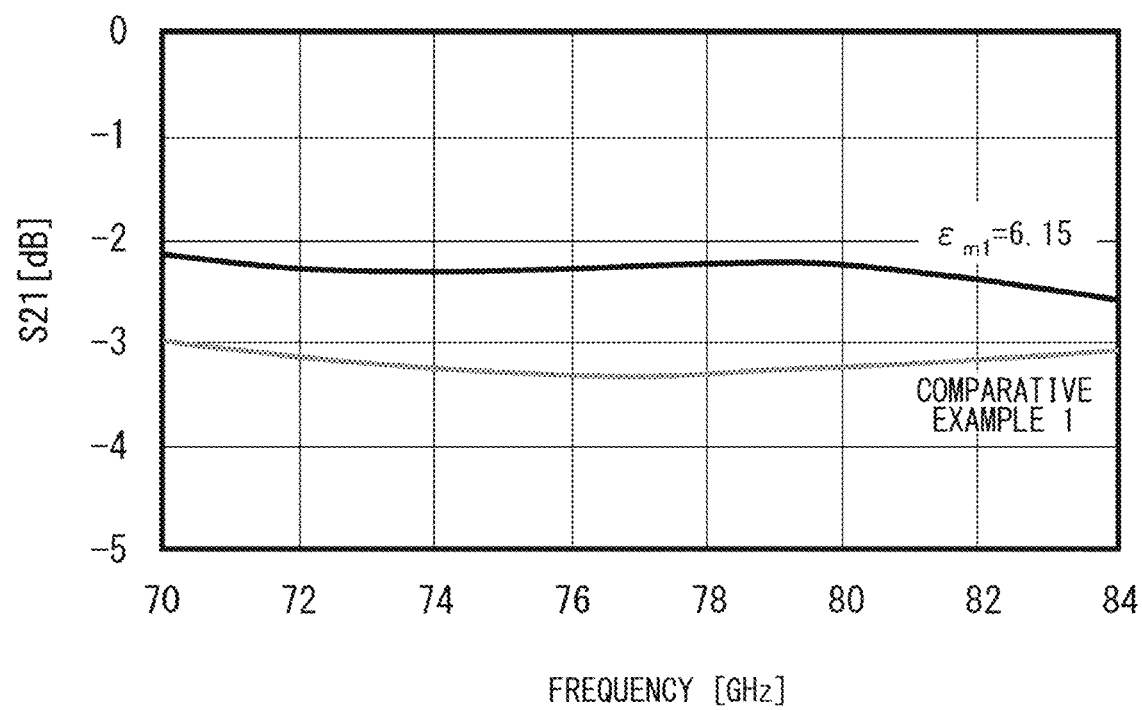
FIG. 6 is a graph showing measured values of electromagnetic wave transmission characteristics of a laminated glass.

Next, the electromagnetic wave transmission characteristics of the laminated glasses 1 were measured in order to verify the relation between the results of the simulations shown in FIG. 5 and results of the measurement. FIG. 6 is a graph showing measurement values (S21: [dB]) of the electromagnetic wave transmission characteristics of the laminated glasses, measured under the below-shown measurement conditions.

The relative dielectric constant of the first interlayer film 31 was set to 6.15 and 2.45 ($\varepsilon_{m1}$=6.15, $\varepsilon_{m1}$=2.45). The relative dielectric constant of the first glass plate 11 was set to 6.72 ($\varepsilon_{g1}$=6.72), and the relative dielectric constant of the second glass plate 12 was set to 6.72 ($\varepsilon_{g2}$=6.72). Note that each of the relative dielectric constants is a relative dielectric constant at a frequency F of 79 GHz (F=79 GHz).

Note that, for each of the first and second glass plates 11 and 12, a glass containing, when expressed by mol percentages based on oxides, $SiO_2$: 69.7%, $Al_2O_3$: 0.9%, MgO: 7%, CaO: 9%, $TiO_2$: 0.05%, $Na_2O$: 12.6%, $K_2O$: 0.6%, and $Fe_2O_3$: 0.2% was used. Note that each of the first and second glass plates 11 and 12 was a glass corresponding to a "Composition Example 1" in a Table 1.

TABLE 1

|  |  | Composition Example 1 | Composition Example 2 | Composition Example 3 | Composition Example 4 | Composition Example 5 |
|---|---|---|---|---|---|---|
| Composition (mol %) | $SiO_2$ | 69.7 | 73.7 | 80 | 65.9 | 75.5 |
|  | $Al_2O_3$ | 0.9 | 0.1 | 2 | 11 | 0.3 |
|  | $B_2O_3$ | 0 | 0 | 13 | 7 | 0 |
|  | MgO | 7 | 0.1 | 0 | 6 | 0 |
|  | CaO | 9 | 11.5 | 0 | 5 | 6 |
|  | SrO | 0 | 0 | 0 | 5 | 0 |
|  | BaO | 0 | 0 | 0 | 0 | 0 |
|  | $TiO_2$ | 0 | 0.05 | 0 | 0 | 0.05 |
|  | $ZrO_2$ | 0 | 0 | 0 | 0 | 0 |
|  | $Li_2O$ | 0 | 0 | 0 | 0 | 6 |
|  | $Na_2O$ | 12.6 | 7.2 | 4 | 0 | 6 |
|  | $K_2O$ | 0.6 | 7.2 | 1 | 0 | 6 |
|  | $Fe_2O_3$ | 0.2 | 0.15 | 0 | 0.1 | 0.15 |
| Relative Dielectric Constant ($\varepsilon_{g1}$, $\varepsilon_{g2}$)@79 GHz | | 6.70 | 6.50 | 4.40 | 5.20 | 6.10 |
| Dielectric Loss Tangent (tan δ)@79 GHz | | 0.032 | 0.02 | 0.012 | 0.011 | 0.015 |

Further, for the first interlayer film 31, a material containing PTFE as a main component (RF-60TC (manufactured by KOREA TACONIC): relative dielectric constant=6.40 at 10 GHz, tan δ=0.002 at 10 GHz) was used as the Example 1, and polyvinyl butyral (PVB) (relative dielectric constant at 10 GHz=2.60) was used as the Comparative Example 1. Note that values of the relative dielectric constant and the dielectric loss tangent (tan δ) of the first interlayer film 31 at 10 GHz were those measured under an environment in which the temperature was in a range of 23° C.±2° C., and the humidity was in a range of 50±5% RH by an SPDR (Split-Post Dielectric Resonator) method.

Note that there is a tendency that the relative dielectric constant of each material of the Example 1 and the Comparative Example 1 decreases as the frequency band increases. Therefore, in the first interlayer film 31 containing PTFE as the main component in the Example 1, the relative dielectric constant at 79 GHz was set to 6.15 ($\varepsilon_{m1}$=6.15) based on the measurement value 6.40 of the relative dielectric constant at 10 GHz. Further, in the first interlayer film 31 (PVB) in the Comparative Example 1, the relative dielectric constant was set to 2.45 ($\varepsilon_{m1}$=2.45) at 79 GHz based on the measurement value 2.60 of the relative dielectric constant at 10 GHz. Further, the thickness of each of the first and second glass plates 11 and 12 was set to 2 mm, and the thickness of the first interlayer film 31 was set to 0.76 mm. The frequency of electromagnetic waves used for the measurement was in a range of 70 GHz to 84 GHz. The incident angle θ of the electromagnetic wave was set to 67.5° (θ=67.5°).

As shown in FIG. 6, when the relative dielectric constant of the interlayer film 13 was set to 2.45 ($\varepsilon_{m1}$=2.45) (Comparative Example 1), the electromagnetic wave transmission characteristic was about −3 dB. Meanwhile, when the relative dielectric constant of the interlayer film 13 was set to 6.15 ($\varepsilon_{m1}$=6.15) (Example 1), the electromagnetic wave transmission characteristic was about −2 dB. Therefore, the electromagnetic wave transmission characteristic was better when the relative dielectric constant of the interlayer film 13 was 6.15 ($\varepsilon_{m1}$=6.15) than when the relative dielectric constant was 2.45 ($\varepsilon_{m1}$=2.45).

Further, when the results of the simulations shown in FIG. 5 were compared with the actual measurement values shown in FIG. 6 (Example 1/Comparative Example 1), the results of the simulations (FIG. 5) and the actual measurement values (FIG. 6) were close to each other for each of the $\varepsilon_{m1}$ of 2.45 ($\varepsilon_{m1}$=2.45) and the $\varepsilon_{m1}$ of 6.15 ($\varepsilon_{m1}$=6.15). Therefore, the results of the simulations in this embodiment corresponds to (i.e., coincides with) the measurement values, and therefore it can be said that the simulations are substantially accurate.

Figure 7:
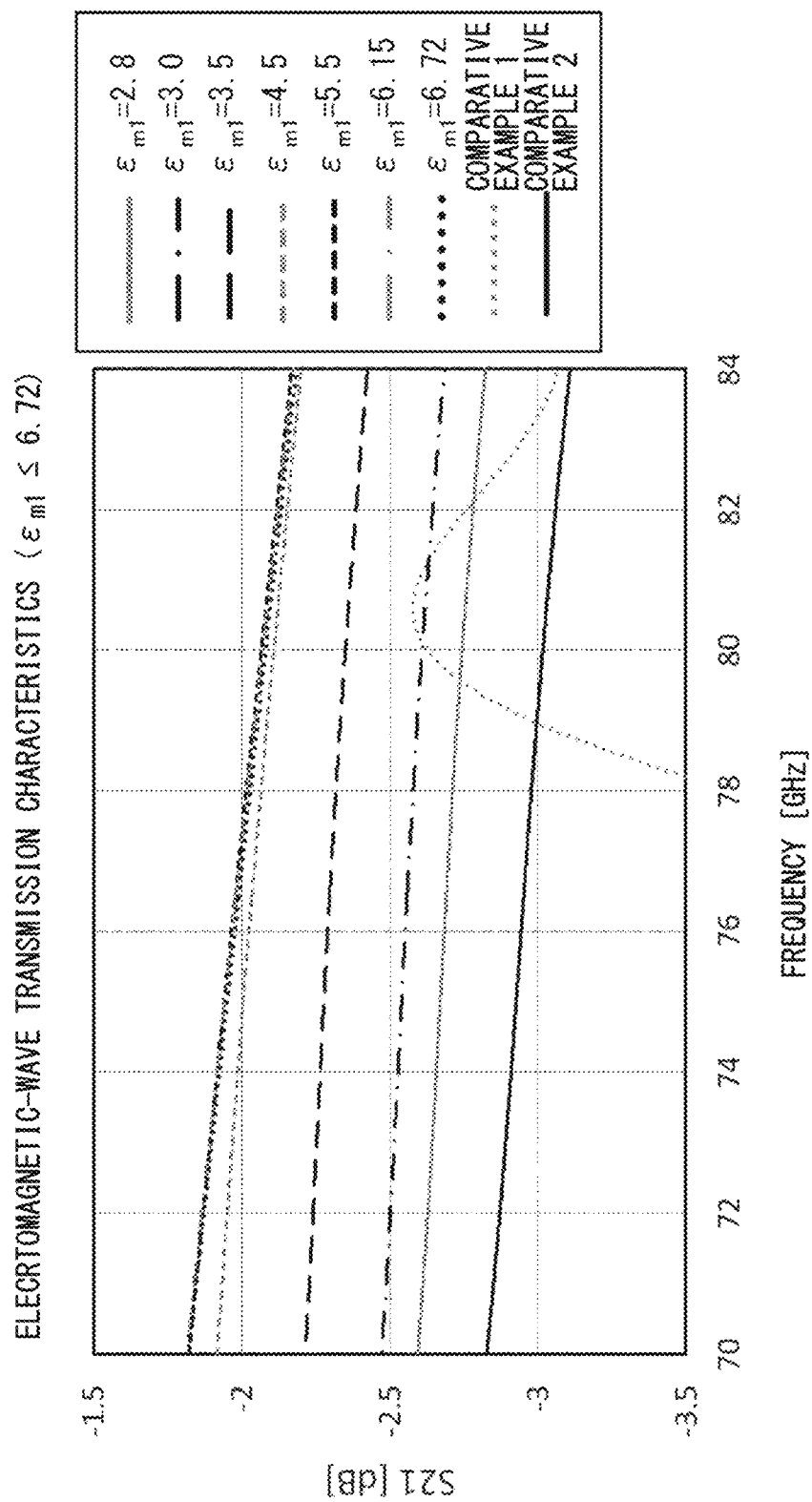
FIG. 7 is a graph showing results of simulations ($\varepsilon_{m1} \leq 6.72$) of the electromagnetic wave transmission characteristics of laminated glasses.
Figure 8:
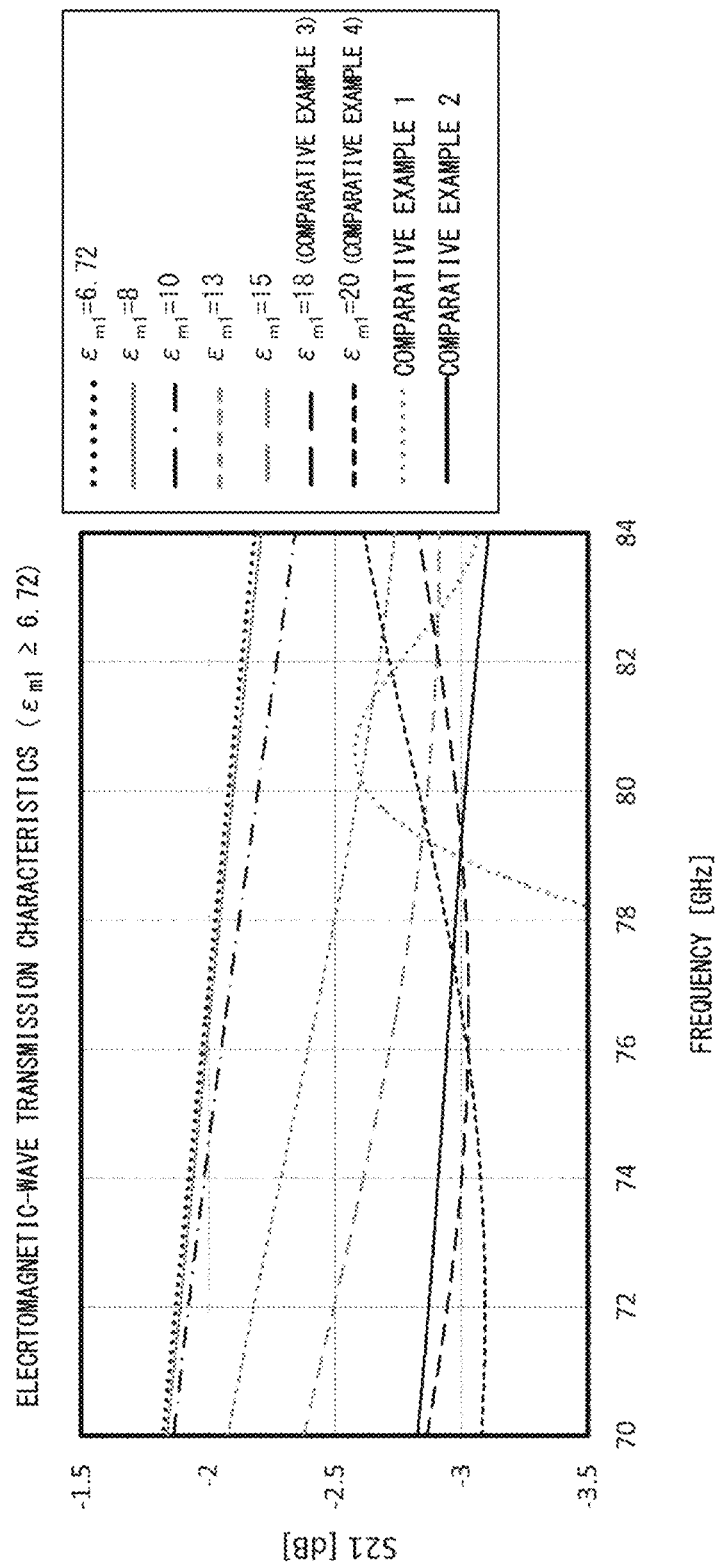
FIG. 8 is a graph showing results of simulations ($\varepsilon_{m1} \geq 6.72$) of electromagnetic wave transmission characteristics of laminated glasses.

Next, a relation between the relative dielectric constant $\varepsilon_{m1}$ of the first interlayer film 31 and the electromagnetic wave transmission characteristic (S21) thereof will be described. FIG. 7 is a graph showing results of simulations of electromagnetic wave transmission characteristics of laminated glasses 1, and shows results of simulations in which the relative dielectric constant of the first interlayer film 31 was smaller than or equal to 6.72 ($\varepsilon_{m1}$≤6.72). FIG. 8 is a graph showing results of simulations of electromagnetic wave transmission characteristics of laminated glasses 1, and shows results of simulations in which the relative dielectric constant of the first interlayer film 31 was larger than or equal to 6.72 ($\varepsilon_{m1}$≥6.72). Note that, in the results of the simulations of the electromagnetic wave transmission characteristics, the higher the value of the transmission characteristic S21 [dB] is, the better the transmitting property for electromagnetic waves are.

The conditions of the simulations shown in FIGS. 7 and 8 are as follows.

In the simulations shown in FIG. 7, the relative dielectric constant $\varepsilon_{m1}$ of the first interlayer film 31 was set to 2.8, 3, 3.5, 4.5, 5.5, 6.15 and 6.72. In the simulations shown in FIG. 8, the relative dielectric constant $\varepsilon_{m1}$ of the first interlayer film 31 was set to 6.72, 8, 10, 13, 15, 18 and 20. The relative dielectric constant of the first interlayer film 31 in each of the Comparative Examples 1 and 2 was set to 2.45 ($\varepsilon_{m1}$=2.45). Further, the relative dielectric constant of the first glass plate 11 was set to 6.72 ($\varepsilon_{g1}$=6.72), and the relative dielectric constant of the second glass plate 12 was set to 6.72 ($\varepsilon_{g2}$=6.72). Note that each of the relative dielectric constants is a relative dielectric constant at a frequency F of 79 GHz (F=79 GHz). The thickness of each of the first and second glass plates 11 and 12 was set to 2 mm, and the thickness of the first interlayer film 13 was set to 0.76 mm. The frequency range in the simulations was set to 70 GHz to 84 GHz. The incident angle θ of the electromagnetic wave in the Comparative Example 1 was set to 0° (θ=0°), and the incident angle θ of the electromagnetic wave was set to 67.5° (θ=67.5°) in all the other cases (including the Comparative Example 2).

Firstly, the results of the simulations shown in FIG. 7, i.e., cases where the relative dielectric constant of the first interlayer film 31 was smaller than or equal to 6.72 ($\varepsilon_{m1} \le 6.72$) will be described. As shown in FIG. 7, in the Comparative Example 2 in which the relative dielectric constant of the first interlayer film 31 was 2.45 ($\varepsilon_{m1}$=2.45), the electromagnetic wave transmission characteristic was the lowest. Further, as the relative dielectric constant $\varepsilon_{m1}$ of the first interlayer film 31 increased, the electromagnetic wave transmission characteristic improved. In particular, as the relative dielectric constant $\varepsilon_{m1}$ of the first interlayer film 31 increased in the order of 3.0, 3.5, 4.5 and 5.5, the electromagnetic wave transmission characteristic also successively improved. Further, when the relative dielectric constant of the first interlayer film 31 was 6.72 ($\varepsilon_{m1}$=6.72), the electromagnetic wave transmission characteristic exhibited the best value.

That is, as the relative dielectric constant of the first interlayer film 31 approaches to 6.72 ($\varepsilon_{m1}$=6.72), the relative dielectric constant of the first interlayer film 31 gets closer to the relative dielectric constant (6.72) of the first and second glass plates 11 and 12. As described above, when the relative dielectric constant of the first interlayer film 31 approaches 6.72 ($\varepsilon_{m1}$=6.72), the difference between the relative dielectric constants of the first glass plate 11 and the first interlayer film 31, and the difference between the relative dielectric constants of the second glass plate 12 and the first interlayer film 31 both decrease, so that the reflection of the electromagnetic wave at the interfaces between the first and second glass plates 11 and 12 and the first interlayer film 31 can be suppressed (i.e., reduced). Therefore, it is possible to improve the transmitting property for electromagnetic waves in the millimeter-wave band. Note that, in the Comparative Example 1 in which the incident angle θ was 0° (θ=0°), the electromagnetic wave transmission characteristic fluctuated according to the frequency of the electromagnetic wave, and the electromagnetic wave transmission characteristic was −3.5 dB or lower in the range of 70 GHz to 78 GHz.

Here, when values of the reflection coefficients $\Gamma_1$ and $\Gamma_2$ are obtained by using the above-shown Expression 1, the below-shown values are obtained. Note that since the relative dielectric constants $\varepsilon_{g1}$ and $\varepsilon_{g2}$ are both 6.72 ($\varepsilon_{g1}=\varepsilon_{g2}$=6.72) under the above-described conditions of the simulations, the values of reflection coefficients $\Gamma_1$ and $\Gamma_2$ become equal to each other.

When the relative dielectric constant $\varepsilon_{m1}$ of the first interlayer film 31 was 2.8, the reflection coefficients $\Gamma_1$ and $\Gamma_2$ were both 0.215 ($\Gamma_1$, $\Gamma_2$=0.215).

When the relative dielectric constant $\varepsilon_{m1}$ of the first interlayer film 31 was 3, the reflection coefficients $\Gamma_1$ and $\Gamma_2$ were both 0.199 ($\Gamma_1$, $\Gamma_2$=0.199).

When the relative dielectric constant $\varepsilon_{m1}$ of the first interlayer film 31 was 3.5, the reflection coefficients $\Gamma_1$ and $\Gamma_2$ were both 0.162 ($\Gamma_1$, $\Gamma_2$=0.162).

When the relative dielectric constant $\varepsilon_{m1}$ of the first interlayer film 31 was 4.5, the reflection coefficients $\Gamma_1$ and $\Gamma_2$ were both 0.100 ($\Gamma_1$, $\Gamma_2$=0.100).

When the relative dielectric constant $\varepsilon_{m1}$ of the first interlayer film 31 was 5.5, the reflection coefficients $\Gamma_1$ and $\Gamma_2$ were both 0.050 ($\Gamma_1$, $\Gamma_2$=0.050).

When the relative dielectric constant $\varepsilon_{m1}$ of the first interlayer film 31 was 6.15, the reflection coefficients $\Gamma_1$ and $\Gamma_2$ were both 0.022 ($\Gamma_1$, $\Gamma_2$=0.022).

When the relative dielectric constant $\varepsilon_{m1}$ of the first interlayer film 31 was 6.72, the reflection coefficients $\Gamma_1$ and $\Gamma_2$ were both 0 ($\Gamma_1$, $\Gamma_2$=0).

From the above-described results, the conditions of the above-shown Expressions 2 and 3 are satisfied when the relative dielectric constant $\varepsilon_{m1}$ of the first interlayer film 31 is 3.0 or higher.

Further, based on the above-described results of the simulations, the preferred range of the relative dielectric constant $\varepsilon_{m1}$ of the first interlayer film 31 is 3.5 or higher, and the ranges of the above-shown Expressions 2 and 3 are expressed as $0.0 \le \Gamma_1 \le 0.162$ and $0.0 \le \Gamma_2 \le 0.162$, respectively. Further, based on the above-described results of the simulations, the more preferred range of the relative dielectric constant $\varepsilon_{m1}$ of the first interlayer film 31 is 4.5 or higher, and the ranges of the above-shown Expressions 2 and 3 are expressed as $0.0 \le \Gamma_1 \le 0.100$ and $0.0 \le \Gamma_2 \le 0.100$, respectively. Further, based on the above-described results of the simulations, the still more preferred range of the relative dielectric constant $\varepsilon_{m1}$ of the first interlayer film 31 is 5.5 or higher, and the ranges of the above-shown Expressions 2 and 3 are expressed as $0.0 \le \Gamma_1 \le 0.050$ and $0.0 \le \Gamma_2 \le 0.050$, respectively.

Next, the results of the simulations shown in FIG. 8, i.e., cases where the relative dielectric constant of the first interlayer film 31 was larger than or equal to 6.72 ($\varepsilon_{m1} \ge 6.72$) (except for Comparative Examples 1 and 2) will be described. As shown in FIG. 8, in the Comparative Example 2 in which the relative dielectric constant of the first interlayer film 31 was 2.45 ($\varepsilon_{m1}$=2.45), the electromagnetic wave transmission characteristic was low. Further, even when the relative dielectric constant was 18 ($\varepsilon_{m1}$=18) (Comparative Example 3) and when the relative dielectric constant was 20 ($\varepsilon_{m1}$=20) (Comparative Example 4), in both of which the relative dielectric constant of the first interlayer film 31 was large, the electromagnetic wave transmission characteristic was low. Meanwhile, as the relative dielectric constant $\varepsilon_{m1}$ of the first interlayer film 31 decreased beyond 18, the electromagnetic wave transmission characteristic improved. In particular, as the relative dielectric constant $\varepsilon_{m1}$ of the interlayer film 13 decreased in the order of 15, 13, 10 and 8, the electromagnetic wave transmission characteristic also successively improved. Further, when the relative dielectric constant of the first interlayer film 31 was 6.72 ($\varepsilon_{m1}$=6.72), the electromagnetic wave transmission characteristic exhibited the best value.

That is, as the relative dielectric constant of the first interlayer film 31 approaches to 6.72 ($\varepsilon_{m1}$=6.72), the relative dielectric constant of the first interlayer film 31 gets closer to the relative dielectric constant (6.72) of the first and second glass plates 11 and 12. As described above, when the relative dielectric constant of the first interlayer film 31 approaches 6.72 ($\varepsilon_{m1}$=6.72), the difference between the relative dielectric constants of the first glass plate 11 and the first interlayer film 31, and the difference between the relative dielectric constants of the second glass plate 12 and the first interlayer film 31 both decrease, so that the reflection of the electromagnetic wave at the interfaces between the first and second glass plates 11 and 12 and the first interlayer film 31 can be suppressed (i.e., reduced). Therefore, it is possible to improve the transmitting property for electromagnetic waves in the millimeter-wave band. Note that, in the Comparative Example 1 in which the incident angle θ was 0° (θ=0°), the electromagnetic wave transmission characteristic fluctuated according to the frequency of the electromagnetic wave, and the electromagnetic wave transmission characteristic was −3.5 dB or lower in the range of 70 GHz to 78 GHz.

Here, when values of the reflection coefficients $\Gamma_1$ and $\Gamma_2$ are obtained by using the above-shown Expression 1, the below-shown values are obtained. Note that since the relative dielectric constants $\varepsilon_{g1}$ and $\varepsilon_{g2}$ are both 6.72 ($\varepsilon_{g1}=\varepsilon_{g2}=6.72$) under the above-described conditions of the simulations, the values of reflection coefficients $\Gamma_1$ and $\Gamma_2$ become equal to each other.

When the relative dielectric constant $\varepsilon_{m1}$ of the first interlayer film 31 was 20, the reflection coefficients $\Gamma_1$ and $\Gamma_2$ were both 0.266 ($\Gamma_1$, $\Gamma_2=0.266$).

When the relative dielectric constant $\varepsilon_{m1}$ of the first interlayer film 31 was 18, the reflection coefficients $\Gamma_1$ and $\Gamma_2$ were both 0.241 ($\Gamma_1$, $\Gamma_2=0.241$).

When the relative dielectric constant $\varepsilon_{m1}$ of the first interlayer film 31 was 15, the reflection coefficients $\Gamma_1$ and $\Gamma_2$ were both 0.198 ($\Gamma_1$, $\Gamma_2=0.198$).

When the relative dielectric constant $\varepsilon_{m1}$ of the first interlayer film 31 was 13, the reflection coefficients $\Gamma_1$ and $\Gamma_2$ were both 0.163 ($\Gamma_1$, $\Gamma_2=0.163$).

When the relative dielectric constant $\varepsilon_{m1}$ of the first interlayer film 31 was 10, the reflection coefficients $\Gamma_1$ and $\Gamma_2$ were both 0.099 ($\Gamma_1$, $\Gamma_2=0.099$).

When the relative dielectric constant $\varepsilon_{m1}$ of the first interlayer film 31 was 8, the reflection coefficients $\Gamma_1$ and $\Gamma_2$ were both 0.046 ($\Gamma_1$, $\Gamma_2=0.046$).

When the relative dielectric constant $\varepsilon_{m1}$ of the first interlayer film 31 was 6.72, the reflection coefficients $\Gamma_1$ and $\Gamma_2$ were both 0 (11, $\Gamma_2=0$).

From the above-described results, the conditions of the above-shown Expressions 2 and 3 are satisfied when the relative dielectric constant $\varepsilon_{m1}$ of the first interlayer film 31 is 15 or lower.

Further, based on the above-described results of the simulations, the preferred range of the relative dielectric constant $\varepsilon_{m1}$ of the first interlayer film 31 is 13 or lower, and the ranges of the above-shown Expressions 2 and 3 are expressed as $0.0 \leq \Gamma_1 \leq 0.163$ and $0.0 \leq \Gamma_2 \leq 0.163$, respectively. Further, based on the above-described results of the simulations, the more preferred range of the relative dielectric constant $\varepsilon_{m1}$ of the first interlayer film 31 is 10 or lower, and the ranges of the above-shown Expressions 2 and 3 are expressed as $0.0 \leq \Gamma_1 \leq 0.099$ and $0.0 \leq \Gamma_2 \leq 0.099$, respectively. Further, based on the above-described results of the simulations, the still more preferred range of the relative dielectric constant $\varepsilon_{m1}$ of the first interlayer film 31 is 8 or lower, and the ranges of the above-shown Expressions 2 and 3 are expressed as $0.0 \leq \Gamma_1 \leq 0.046$ and $0.0 \leq \Gamma_2 \leq 0.046$, respectively.

From the results of the simulations shown in FIGS. 7 and 8, it can be said that when the range of the relative dielectric constant $\varepsilon_{m1}$ of the first interlayer film 31 is a range of $3 \leq \varepsilon_{m1} \leq 15$, preferably a range of $3.5 \leq \varepsilon_{m1} \leq 13$, more preferably a range of $4.5 \leq \Gamma_{m1} \leq 10$, and still more preferably a range of $5.5 \leq \varepsilon_{m1} \leq 8$, the electromagnetic wave transmission characteristic of the laminated glass is excellent.

Figure 9:
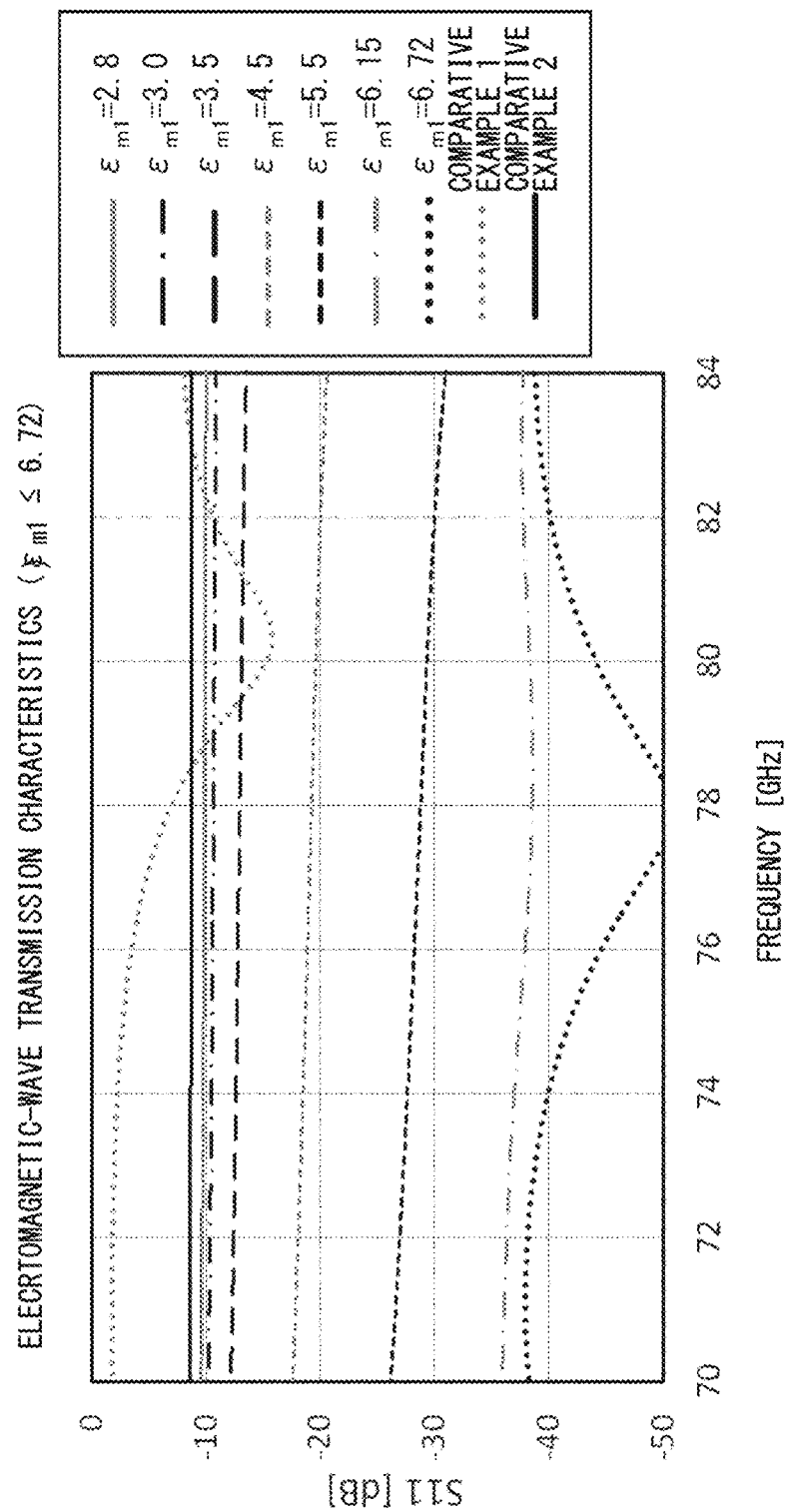
FIG. 9 is a graph showing results of simulations ($\varepsilon_{m1} \leq 6.72$) of electromagnetic wave reflection characteristics of laminated glasses.
Figure 10:
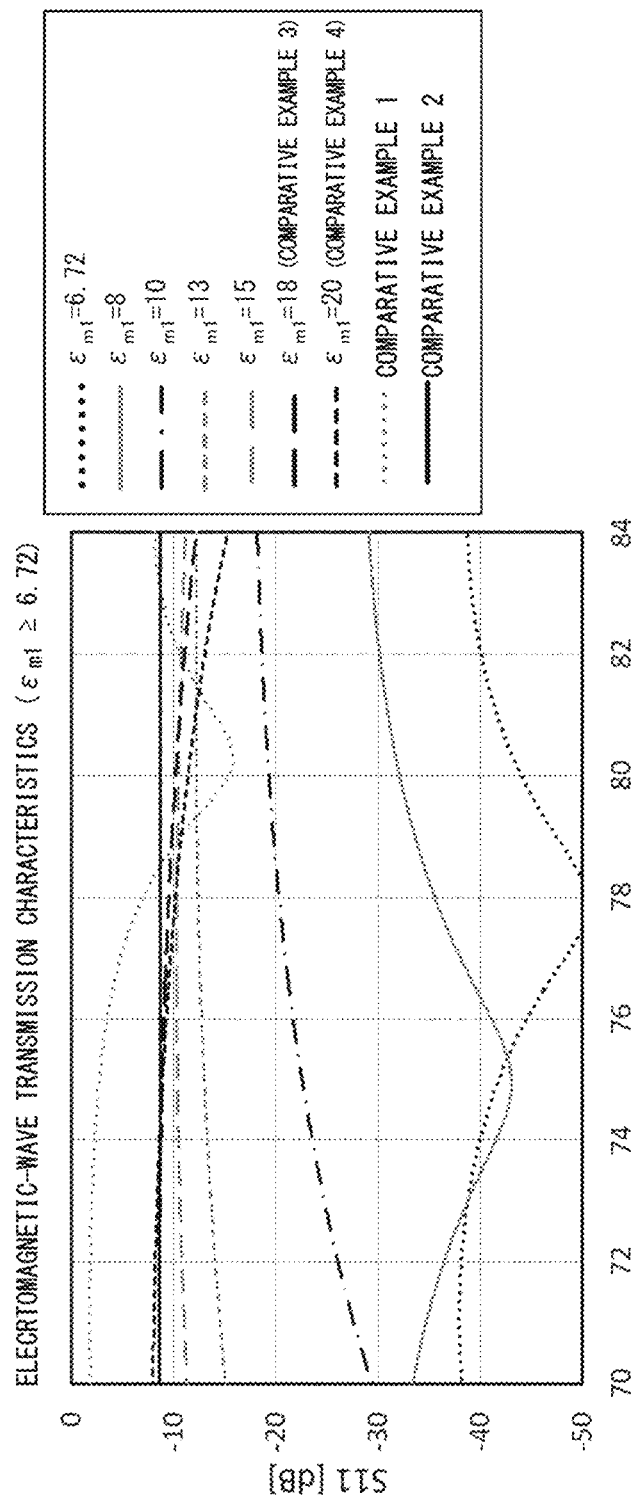
FIG. 10 is a graph showing results of simulations ($\varepsilon_{m1} \geq 6.72$) of electromagnetic wave reflection characteristics of laminated glasses.

Next, a relation between the relative dielectric constant of the first interlayer film 31 and the electromagnetic wave reflection characteristic thereof will be described. FIG. 9 is a graph showing results of simulations of electromagnetic wave reflection characteristics of laminated glasses 1, and shows results of simulations in which the relative dielectric constant of the first interlayer film 31 was smaller than or equal to 6.72 ($\varepsilon_{m1} \leq 6.72$). FIG. 10 is a graph showing results of simulations of electromagnetic wave reflection characteristics of laminated glasses 1, and shows results of simulations in which the relative dielectric constant of the first interlayer film 31 was larger than or equal to 6.72 ($\varepsilon_{m1} \geq 6.72$). Note that, in the result of the simulations of the electromagnetic wave reflection characteristics, the lower the value of the transmission characteristic S11 [dB] is, the less the electromagnetic wave is reflected, and hence the better the transmitting property for electromagnetic waves are.

The conditions of the simulations shown in FIGS. 9 and 10 are as follows.

In the simulations shown in FIG. 9, the relative dielectric constant $\varepsilon_{m1}$ of the first interlayer film 31 was set to 2.8, 3, 3.5, 4.5, 5.5, 6.15 and 6.72. In the simulations shown in FIG. 10, the relative dielectric constant $\varepsilon_{m1}$ of the first interlayer film 31 was set to 6.72, 8, 10, 13, 15, 18 and 20. The relative dielectric constant of the first interlayer film 31 in each of the Comparative Examples 1 and 2 was set to 2.45 ($\varepsilon_{m1}=2.45$). Further, the relative dielectric constant of the first glass plate 11 was set to 6.72 ($\varepsilon_{g1}=6.72$), and the relative dielectric constant of the second glass plate 12 was set to 6.72 ($\varepsilon_{g2}=6.72$). Note that each of the relative dielectric constants is a relative dielectric constant at a frequency F of 79 GHz (F=79 GHz). The thickness of each of the first and second glass plates 11 and 12 was set to 2 mm, and the thickness of the first interlayer film 31 was set to 0.76 mm. The frequency range in the simulations was set to 70 GHz to 84 GHz. The incident angle $\theta$ of the electromagnetic wave in the Comparative Example 1 was set to 0° ($\theta=0°$), and the incident angle $\theta$ of the electromagnetic wave was set to 67.5° ($\theta=67.5°$) in all the other cases.

Firstly, the results of the simulations shown in FIG. 9, i.e., cases where the relative dielectric constant of the first interlayer film 31 was smaller than or equal to 6.72 ($\varepsilon_{m1} \leq 6.72$) will be described. As shown in FIG. 9, in the Comparative Examples 1 and 2 in which the relative dielectric constant of the first interlayer film 31 was 2.45 ($\varepsilon_{m1}=2.45$), the electromagnetic wave reflection characteristic was high. When the relative dielectric constant $\varepsilon_{m1}$ of the first interlayer film 31 is 2.8 or higher, the electromagnetic wave reflection characteristic improved (decreased) as the relative dielectric constant $\varepsilon_{m1}$ of the first interlayer film 31 increased. In particular, as the relative dielectric constant $\varepsilon_{m1}$ of the first interlayer film 31 increased in the order of 3.0, 3.5, 4.5 and 5.5, the electromagnetic wave reflection characteristic also successively and significantly improved (decreased). Further, when the relative dielectric constant of the first interlayer film 31 was 6.72 ($\varepsilon_{m1}=6.72$), the electromagnetic wave reflection characteristic was the lowest.

That is, as the relative dielectric constant of the first interlayer film 31 approaches to 6.72 ($\varepsilon_{m1}=6.72$), the relative dielectric constant of the first interlayer film 31 gets closer to the relative dielectric constant (6.72) of the first and second glass plates 11 and 12. As described above, when the relative dielectric constant of the first interlayer film 31 approaches 6.72 ($\varepsilon_{m1}=6.72$), the difference between the relative dielectric constants of the first glass plate 11 and the first interlayer film 31, and the difference between the relative dielectric constants of the second glass plate 12 and the first interlayer film 31 both decrease, so that the reflection of the electromagnetic wave at the interfaces between the first and second glass plates 11 and 12 and the first interlayer film 31 can be suppressed (i.e., reduced). Note that the values of the reflection coefficients $\Gamma_1$ and $\Gamma_2$ in the above-described simulations were equal to or close to those in the simulation shown in FIG. 7.

Next, the results of the simulation shown in FIG. 10, i.e., cases where the relative dielectric constant of the interlayer film was larger than or equal to 6.72 ($\varepsilon_{m1} \geq 6.72$) (except for Comparative Examples 1 and 2) will be described. As shown in FIG. 10, in the Comparative Examples 1 and 2 in which the relative dielectric constant of the first interlayer film 31 was 2.45 ($\varepsilon_{m1}$=2.45), the electromagnetic wave reflection characteristic was high. Further, even when the relative dielectric constant $\varepsilon_{m1}$ of the first interlayer film 31 was in a range of 18 (Comparative Example 3) to 20 (Comparative Example 4), the electromagnetic wave reflection characteristics were high. Meanwhile, as the relative dielectric constant $\varepsilon_{m1}$ of the first interlayer film 31 decreased in the order of 15, 13, 10 and 8, the electromagnetic wave reflection characteristic also successively improved (decreased).

Further, when the relative dielectric constant of the first interlayer film 31 was 6.72 ($\varepsilon_{m1}$=6.72), the electromagnetic wave reflection characteristic was the lowest.

That is, as the relative dielectric constant of the first interlayer film 31 approaches to 6.72 ($\varepsilon_{m1}$=6.72), the relative dielectric constant of the first interlayer film 31 gets closer to the relative dielectric constant (6.72) of the first and second glass plates 11 and 12. As described above, when the relative dielectric constant of the first interlayer film 31 approaches 6.72 ($\varepsilon_{m1}$=6.72), the difference between the relative dielectric constants of the first glass plate 11 and the first interlayer film 31, and the difference between the relative dielectric constants of the second glass plate 12 and the first interlayer film 31 both decrease, so that the reflection of the electromagnetic wave at the interfaces between the first and second glass plates 11 and 12 and the first interlayer film 31 can be suppressed (i.e., reduced). Note that the values of the reflection coefficients $\Gamma_1$ and $\Gamma_2$ in the above-described simulations were equal to or close to those in the simulation shown in FIG. 8.

Based on the results of the simulations of electromagnetic wave transmission characteristics shown in FIG. 7 and those of electromagnetic wave reflection characteristics shown in FIG. 9, in the range in which the relative dielectric constant $\varepsilon_{m1}$ of the first interlayer film 31 is smaller than or equal to 6.72 ($\varepsilon_{m1}$≤6.72), when the relative dielectric constant $\varepsilon_{m1}$ of the first interlayer film 31 is 3 or higher, preferably 3.5 or higher, more preferably 4.5 or higher, and still more preferably 5.5 or higher, the transmitting property for electromagnetic waves in the millimeter-wave band can be improved.

Further, based on the results of the simulations of electromagnetic wave transmission characteristics shown in FIG. 8 and those of electromagnetic wave reflection characteristics shown in FIG. 10, in the range in which the relative dielectric constant $\varepsilon_{m1}$ of the first interlayer film 31 is higher than or equal to 6.72 ($\varepsilon_{m1}$≥6.72), when the relative dielectric constant $\varepsilon_{m1}$ of the first interlayer film 31 is 15 or lower, preferably 13 or lower, more preferably 10 or lower, and still more preferably 8 or lower, the transmitting property for electromagnetic waves in the millimeter-wave band can be improved.

Figure 11:
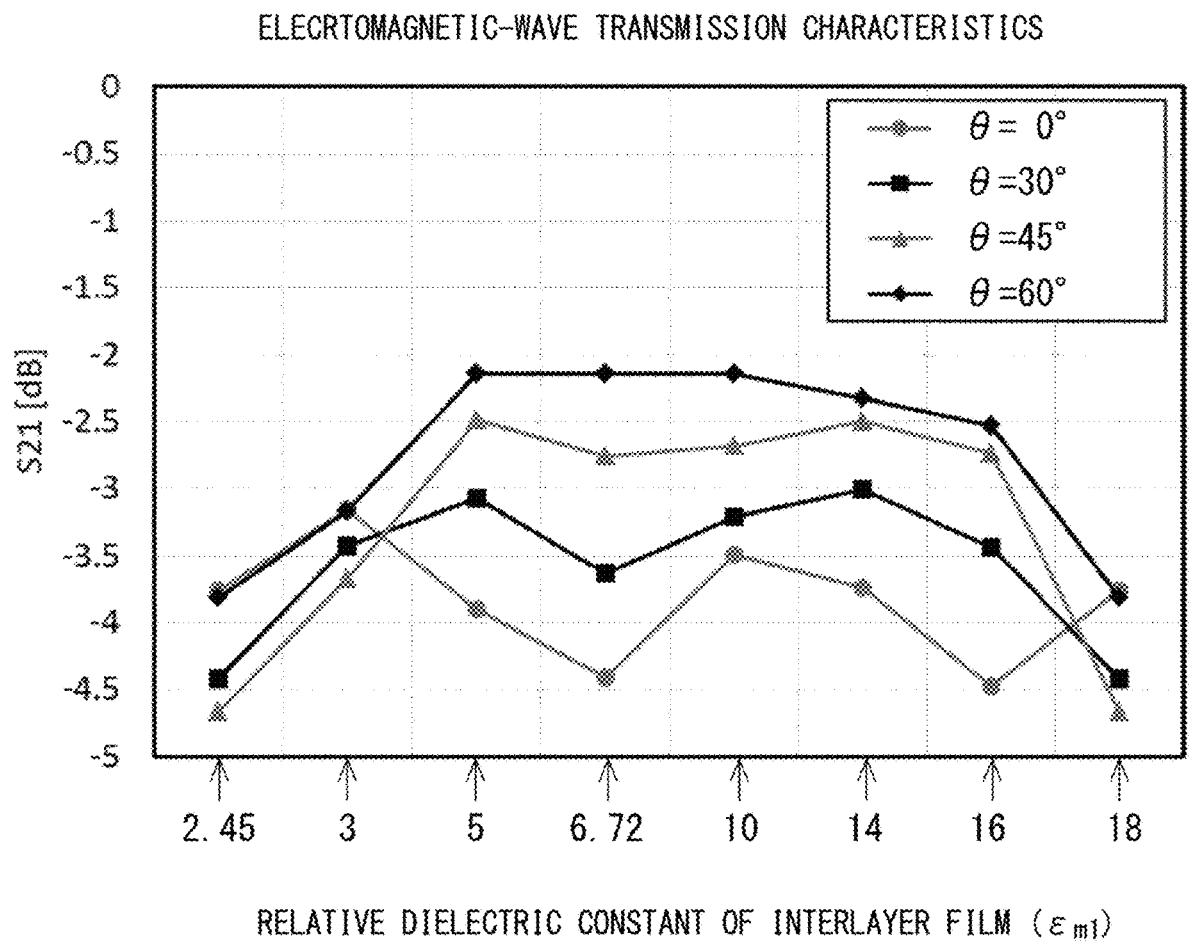
FIG. 11 is a graph showing results of simulations of electromagnetic wave transmission characteristics of laminated glasses for a relative dielectric constant $\varepsilon_{m1}$ of an interlayer film.

FIG. 11 is a graph showing results of simulations of electromagnetic wave transmission characteristics of laminated glasses 1 for the relative dielectric constant $\varepsilon_{m1}$ of the first interlayer film 31. FIG. 11 shows results of simulations when the incident angle θ of the electromagnetic wave on the laminated glass 1 was 0°, 30°, 45° and 60°.

In the simulations shown in FIG. 11, the relative dielectric constant $\varepsilon_{m1}$ of the first interlayer film 31 was set to 2.45, 3, 5, 6.72, 10, 14, 16 and 18. Further, the relative dielectric constant of the first glass plate 11 was set to 6.72 ($\varepsilon_{g1}$=6.72), and the relative dielectric constant of the second glass plate 12 was set to 6.72 ($\varepsilon_{g2}$=6.72). Note that each of the relative dielectric constants is a relative dielectric constant at a frequency F of 79 GHz (F=79 GHz). The thickness of each of the first and second glass plates 11 and 12 was set to 2 mm, and the thickness of the first interlayer film 31 was set to 0.76 mm. The frequency range in the simulations was set to 70 GHz to 84 GHz, and average values of electromagnetic wave transmission characteristics in this frequency range were plotted on the graph.

Further, the incident angle θ of the electromagnetic wave on the laminated glass 1 was 0°, 30°, 45° and 60°.

As shown in FIG. 11, in the case where the incident angle θ of the electromagnetic wave on the laminated glass 1 was 0°, the electromagnetic wave transmission characteristic exhibited high values when the relative dielectric constant of the first interlayer film 31 was set to 3 and 10 ($\varepsilon_{m1}$=3, $\varepsilon_{m1}$=10). Meanwhile, when the relative dielectric constant of the first interlayer film 31 was set to 6.72 and 16 ($\varepsilon_{m1}$=6.72, $\varepsilon_{m1}$=16), the electromagnetic wave transmission characteristic had low values. In the case where the incident angle θ of the electromagnetic wave on the laminated glass 1 was 30°, the electromagnetic wave transmission characteristic exhibited high values when the relative dielectric constant of the first interlayer film 31 was set to 5 and 14 ($\varepsilon_{m1}$=5, $\varepsilon_{m1}$=14). Meanwhile, when the relative dielectric constant of the first interlayer film 31 was set to 2.45 and 18 ($\varepsilon_{m1}$=2.45, $\varepsilon_{m1}$=18), the electromagnetic wave transmission characteristic has low values.

In the case where the incident angle θ of the electromagnetic wave on the laminated glass 1 was 45°, the electromagnetic wave transmission characteristic exhibited high values when the relative dielectric constant of the first interlayer film 31 was in a range of 5 to 16 ($\varepsilon_{m1}$=5 to 16). Meanwhile, when the relative dielectric constant of the first interlayer film 31 was set to 2.45 and 18 ($\varepsilon_{m1}$=2.45, $\varepsilon_{m1}$=18), the electromagnetic wave transmission characteristic has low values. In the case where the incident angle θ of the electromagnetic wave on the laminated glass 1 was 60°, the electromagnetic wave transmission characteristic exhibited high values when the relative dielectric constant of the first interlayer film 31 was in a range of 5 to 16 ($\varepsilon_{m1}$=5 to 16). Meanwhile, when the relative dielectric constant of the first interlayer film 31 was set to 2.45 and 18 ($\varepsilon_{m1}$=2.45, $\varepsilon_{m1}$=18), the electromagnetic wave transmission characteristic has low values.

In the results of the simulations shown in FIG. 11, the larger the incident angle θ of the electromagnetic wave on the laminated glass 1 was, the higher the value of the electromagnetic wave transmission characteristic became. Further, when the incident angle θ of the electromagnetic wave on the laminated glass 1 was 0°, the value of the electromagnetic wave transmission characteristic decreased when the relative dielectric constant of the first interlayer film 31 was 6.72 ($\varepsilon_{m1}$=6.72). However, as the incident angle θ of the electromagnetic wave on the laminated glass 1 was increased in the order of 30°, 45° and 60°, the decrease of the value of the electromagnetic wave transmission characteristic when the relative dielectric constant $\varepsilon_{m1}$ was 6.72 ($\varepsilon_{m1}$=6.72) was alleviated (i.e., reduced).

Figure 12:
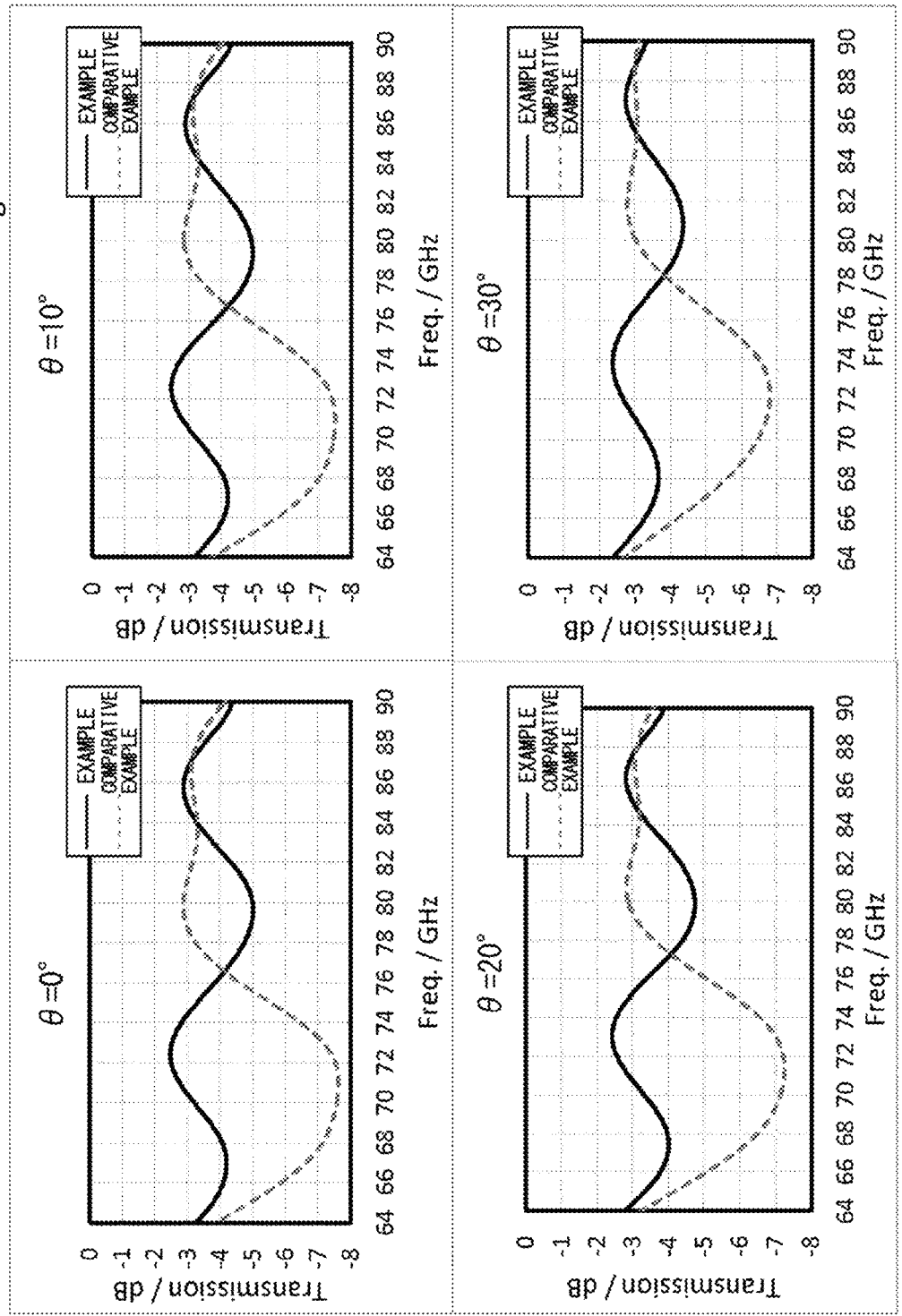
FIG. 12 is a graph showing results of simulations (incident angle θ=0° to 30°) of electromagnetic wave transmission characteristics of laminated glasses.
Figure 13:
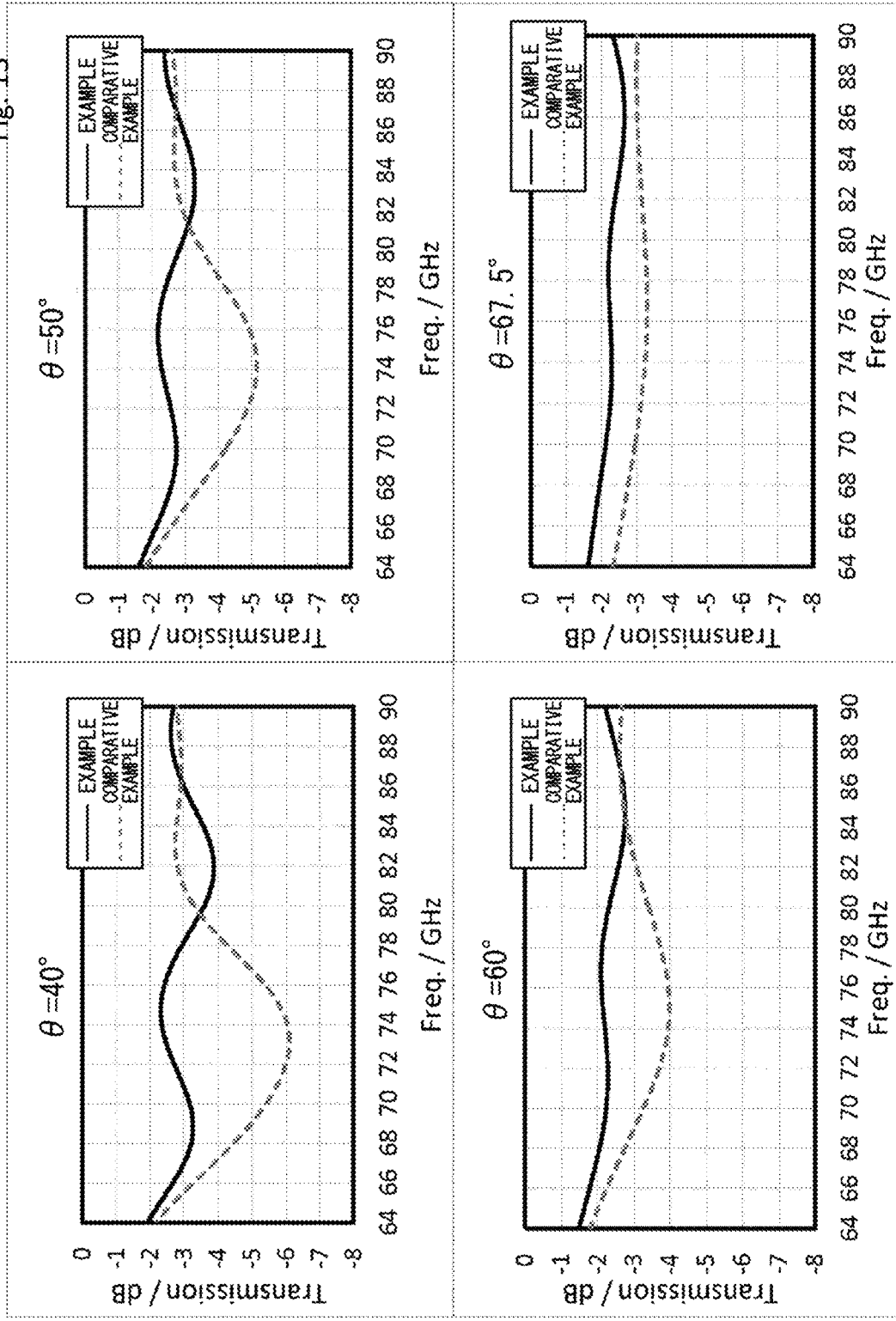
FIG. 13 is a graph showing results of simulations (incident angle θ=40° to 67.5°) of electromagnetic wave transmission characteristics of laminated glasses.

Each of FIGS. 12 and 13 shows results of simulations of electromagnetic wave transmission characteristics of laminated glasses 1. FIG. 12 shows results of simulations in which the incident angle θ of the electromagnetic wave on the laminated glass 1 was in a range of 0° to 30°, and FIG. 13 shows results of simulations in which the incident angle θ of the electromagnetic wave on the laminated glass 1 was in a range of 40° to 67.5°.

In the simulations shown in FIGS. 12 and 13, the relative dielectric constant $\varepsilon_{m1}$ of the first interlayer film 31 of the laminated glass 1 (Example 1) according to the embodiment of the present invention was set to 6.15, and the relative dielectric constant $\varepsilon_{m1}$ of the first interlayer film 31 of each of the Comparative Examples 1 and 2 was set to 2.45. Further, the relative dielectric constant of the first glass plate 11 was set to 6.72 ($\varepsilon_{g1}$=6.72), and the relative dielectric constant of the second glass plate 12 was set to 6.72 ($\varepsilon_{g2}$=6.72). Note that each of the relative dielectric constants is a relative dielectric constant at a frequency F of 79 GHz (F=79 GHz). The thickness of each of the first and second glass plates 11 and 12 was set to 2 mm, and the thickness of the first interlayer film 31 was set to 0.76 mm. The frequency range in the simulation was set to 64 GHz to 90 GHz.

As shown in FIGS. 12 and 13, in the comparative examples, when the incident angle θ of the electromagnetic wave on the laminated glass 1 was in a range of 0° to 50°, the electromagnetic wave transmission characteristic decreased and had the minimum value in a range of 66 GHz to 74 GHz. In contrast to this, in the laminated glass 1 (Example 1) according to the embodiment of the present invention, in the range in which the incident angle θ of the electromagnetic wave on the laminated glass 1 was in a range of 0° to 67.5°, the electromagnetic wave transmission characteristic did not extremely deteriorate, and the electromagnetic wave transmission characteristic was stable in a range of 64 GHz to 90 GHz as compared to those in the Comparative Examples 1 and 2. Further, in the laminated glass 1 (Example 1) according to the embodiment of the present invention, as the incident angle θ of the electromagnetic wave on the laminated glass 1 increased, the fluctuations of the electromagnetic wave transmission characteristic, which were caused as the frequency changed, decreased. Further, as a whole, the laminated glass 1 (Example 1) according to the embodiment of the present invention exhibited higher electromagnetic wave transmission characteristics than those in the Comparative Examples 1 and 2. In particular, when the incident angle θ of the electromagnetic wave on the laminated glass 1 was 60° or higher, the values of the electromagnetic wave transmission characteristics of the laminated glass 1 (Example 1) according to the embodiment of the present invention were higher over the entire range of 64 GHz to 90 GHz than those in the Comparative Examples 1 and 2.

Examples 2 to 13, Comparative Examples 1 to 4

Next, for glasses having the Composition Examples 1 to 5 shown in Table 1, five combinations of the first and second glass plates 11 and 12, and three types of materials for the first interlayer film 31 were prepared, and 15 types of laminated glasses were examined in total. Specifically, for each of the examples and each of the comparative examples, a result of a simulation in which an electromagnetic wave having a frequency of 79 GHz was made incident (i.e., was applied) at an incident angle θ of 67.5° (θ=67.5°) was obtained. Note that the thickness of each of the first and second glass plates 11 and 12 was set to 2 mm, and the thickness of the first interlayer film 31 was set to 0.76 mm. Note that the laminated glasses according to the Comparative Examples 1 to 2 were the same as those of the above-described Comparative Examples 1 to 2. Further, for the first interlayer film 31 in each of the examples and each of the comparative examples, the relative dielectric constant $\varepsilon_{m1}$ at 79 GHz was calculated based on the measurement value of the relative dielectric constant at 10 GHz.

TABLE 2

| | First Glass Plate 11<br>Second Glass Plate 12 | $\varepsilon_{g1}$ (@79 GHz)<br>$\varepsilon_{g2}$ (@79 GHz) | First Interlayer Film 31 | $\varepsilon_{m1}$ (@79 GHz) | $\Gamma_2$ (@79 GHz) | $\varepsilon_{g1}$-$\varepsilon_{m1}$ (@79 GHz) | Electromagnetic-Wave Transmitting Property (S21)<br>Lower than −2.8 dB: X<br>−2.8 dB or larger: Δ<br>−1.6 dB or larger: ○<br>−1.2 dB or larger: ◎ |
|---|---|---|---|---|---|---|---|
| Comparative Example 1, 2 | Composition Example 1 | 6.72 | PVB | 2.45 | 0.247 | 4.27 | X |
| Comparative Example 3 | Composition Example 2 | 6.50 | PVB | 2.45 | 0.239 | 4.05 | X |
| Example 2 | Composition Example 3 | 4.40 | PVB | 2.45 | 0.145 | 1.95 | ○ |
| Example 3 | Composition Example 4 | 5.20 | PVB | 2.45 | 0.186 | 2.75 | ○ |
| Comparative Example 4 | Composition Example 5 | 6.10 | PVB | 2.45 | 0.224 | 3.65 | X |

TABLE 2-continued

| | First Glass Plate 11 εg1 (@79 GHz) Second Glass Plate 12 εg2 (@79 GHz) | First Interlayer Film 31 | $\varepsilon_{m1}$ (@79 GHz) | $\Gamma_2$ (@79 GHz) | $\varepsilon_{g1}-\varepsilon_{m1}$ (@79 GHz) | Electromagnetic-Wave Transmitting Property (S21) Lower than −2.8 dB: X −2.8 dB or larger: Δ −1.6 dB or larger: ○ −1.2 dB or larger: ◎ |
|---|---|---|---|---|---|---|
| Example 4 | Composition Example 1 | 6.72 | PVB + Glass Powder (Composition Example 1) | 3.50 | 0.162 | 3.22 | Δ |
| Example 5 | Composition Example 2 | 6.50 | PVB + Glass Powder (Composition Example 1) | 3.50 | 0.154 | 3.00 | Δ |
| Example 6 | Composition Example 3 | 4.40 | PVB + Glass Powder (Composition Example 1) | 3.50 | 0.057 | 0.90 | Δ |
| Example 7 | Composition Example 4 | 5.20 | PVB + Glass Powder (Composition Example 1) | 3.50 | 0.099 | 1.70 | ○ |
| Example 8 | Composition Example 5 | 6.10 | PVB + Glass Powder (Composition Example 1) | 3.50 | 0.138 | 2.60 | Δ |
| Example 9 | Composition Example 1 | 6.72 | PVB + BaTiO$_3$ | 6.60 | 0.005 | 0.12 | Δ |
| Example 10 | Composition Example 2 | 6.50 | PVB + BaTiO$_3$ | 6.60 | −0.004 | −0.10 | Δ |
| Example 11 | Composition Example 3 | 4.40 | PVB + BaTiO$_3$ | 6.60 | −0.101 | −2.20 | Δ |
| Example 12 | Composition Example 4 | 5.20 | PVB + BaTiO$_3$ | 6.60 | −0.060 | −1.40 | ○ |
| Example 13 | Composition Example 5 | 6.10 | PVB + BaTiO$_3$ | 6.60 | −0.020 | −0.50 | ◎ |

PVB ($\varepsilon_{m1}$=2.45) was used for the first interlayer film 31 in the laminated glass of each of the Comparative Examples 1 to 4 and each of the Examples 2 and 3. In the first interlayer film 31 of the laminated glass of each of the Examples 4 to 8, a powder of the glass (the particle diameter was 100 μm or smaller) shown in the "Composition Example 1" in the Table 1 was mixed (dry-blended) in the PVB, which was the matrix resin, while adjusting the volume content thereof so as to be within a range of 1 vol % to 50 vol %. Further, in the first interlayer film 31 of the laminated glass of each of the Examples 9 to 13, a powder of barium titanate (BaTiO$_3$) having a particle diameter of 1 μm or smaller was mixed (dry-blended) in the PVB, which was the matrix resin, while adjusting the volume content thereof so as to be within a range of 1 vol % to 50 vol %. Then, this mixture was charged into a resin melting biaxial kneader (Labo Plastomill manufactured by Toyo Seiki Seisaku-sho, Ltd.), and melted and kneaded at a screw rotation speed of 50 rpm at a kneading temperature of 160° C. for a kneading time of 3 minutes, and as a result, a composite sample was obtained. This composite sample was press-molded at 160° C. by a thermal press (Mini Test Press manufactured by Toyo Seiki Seisaku-sho, Ltd.), and as a result, a sheet having a thickness of 0.4 mm was obtained. Then, the relative dielectric constant and the dielectric loss tangent of the sheet were measured by the above-described SPDR method.

From the results shown in a Table 2, it was confirmed that, in the Examples 2 to 13, the smaller the reflection coefficient $\Gamma_1$ was, the larger the transmission characteristic S21 became, and hence the better the transmitting property for electromagnetic waves became. Further, the Example 13, in which: the reflection coefficient $\Gamma_1$ was 0.05 or smaller; the relative dielectric constants of the first glass plate 11, the second glass plate 12, and the first interlayer film 31 ($\varepsilon_{g1}$, $\varepsilon_{g2}$ and $\varepsilon_{m1}$) were 5.5 or higher; and the dielectric loss tangents (tan δ at 79 GHz) of the first and second glass plates 11 and 12 were 0.018 or smaller, exhibited the best transmission characteristic S21.

In the above-described embodiment, cases where the first interlayer film 31 has a one-layer structure have been described. However, in the present invention, the first interlayer film 31 may further include another layer(s). For example, in the present invention, the interlayer film 13 (the first interlayer film 31, or the first and second interlayer films 31 and 32) may further include a sound insulation layer. The sound insulation layer has, for example, a three-layer structure including a first skin layer and a second skin layer on each of both sides of a core layer. It is possible to maintain the sound insulation property by making the elastic modulus of the core layer smaller than those of the first and second skin layers. Note that the elastic modulus is a value of a storage elastic modulus when frequency dispersion measurement is performed at a strain of 0.05% by using a dynamic mechanical analysis (DMA) device. In this manner, it is possible to improve the sound insulation property of the laminated glass by including the sound insulation layer therein.

Further, in the present invention, a black ceramic film may be printed on a part(s) (for example, a peripheral part(s)) of the first and second glass plates 11 and 12. Further, the laminated glass 1 according to the present invention may be used as a radome of a millimeter-wave radar device.

While the present invention has been described in view of the above-described embodiments, the present invention is not limited to the configurations of the above-described embodiments. Further, needless to say, the present invention includes various changes, modifications, and combinations that may be made by one skilled in the art within the scope of the claims of the present application.

What is claimed is:

1. A laminated glass comprising:
   a first glass plate;
   a second glass plate; and
   an interlayer film held between the first and second glass plates, wherein
   when a predetermined frequency between 60 GHz and 100 GHz is represented by F [GHz]; a relative dielectric constant of the first glass plate at the frequency F is represented by $\varepsilon_{g1}$; a relative dielectric constant of the second glass plate at the frequency F is represented by $\varepsilon_{g2}$, a relative dielectric constant of a first interlayer film provided in a first region of the interlayer film is represented by $\varepsilon_{m1}$; a reflection coefficient at an interface between the first glass plate and the first interlayer film when an electromagnetic wave having the frequency F is incident on the laminated glass is represented by $\Gamma_1$; and a reflection coefficient at an interface between the second glass plate and the first interlayer film when the electromagnetic wave having the frequency F is incident on the laminated glass is represented by $\Gamma_2$, below-shown relations are satisfied:

$$\Gamma_1 = \frac{|\sqrt{\varepsilon_{g1}} - \sqrt{\varepsilon_{m1}}|}{\sqrt{\varepsilon_{g1}} + \sqrt{\varepsilon_{m1}}} \quad \Gamma_2 = \frac{|\sqrt{\varepsilon_{g2}} - \sqrt{\varepsilon_{m1}}|}{\sqrt{\varepsilon_{g2}} + \sqrt{\varepsilon_{m1}}}$$

and $0.0 \le \Gamma_1 \le 0.2$; and $0.0 \le \Gamma_2 \le 0.2$, and wherein the first interlayer film comprises (a) at least one material selected from the group consisting of polyvinyl butyral, ethylene vinyl acetate, a cycloolefin polymer, a urethane resin, and a polyvinylidene fluoride resin (PVDF) and (b) at least one filler selected from the group consisting of $Al_2O_3$, $TiO_2$, $SiO_2$, $ZrO_2$, YSZ, $SnO_2$, forsterite, cordierite, steatite, barium magnesium-acid niobate, barium neodymium titanate, lead zirconate titanate (PZT), borosilicate glass, non-alkali glass, glass fiber, soda lime glass, phosphate glass, $BaTiO_3$, $SrTiO_3$, $BaSrTiO_3$, aluminum nitride, and $MnO_2$.

2. The laminated glass according to claim 1, wherein in a plan view of the first glass plate of the laminated glass, the relative dielectric constant of the first interlayer film at the frequency F satisfies below-shown relations:

$0.0 \le |\varepsilon_{g1} - \varepsilon_{m1}|/\varepsilon_{g1} \le 0.6$; and $0.0 \le |\varepsilon_{g2} - \varepsilon_{m1}|/\varepsilon_{g2} \le 0.6$.

3. The laminated glass according to claim 1, wherein
the interlayer film includes the first region and a second region in a plan view of the first glass plate, and
when a relative dielectric constant of a second interlayer film provided in the second region at the frequency F is represented by $\varepsilon_{m2}$, below-shown relations are satisfied:

$\varepsilon_{m2} \ne \varepsilon_{m1}$, and $|\varepsilon_{g1} - \varepsilon_{m2}|/\varepsilon_{g1} > 0.6$; and $|\varepsilon_{g2} - \varepsilon_{m2}|/\varepsilon_{g2} > 0.6$.

4. The laminated glass according to claim 3, wherein the relative dielectric constants $\varepsilon_{m1}$ and $\varepsilon_{m2}$ satisfy a below-shown relation:

$\varepsilon_{m1} > \varepsilon_{m2}$.

5. The laminated glass according to claim 3, wherein the relative dielectric constants $\varepsilon_{m1}$ and $\varepsilon_{m2}$ satisfy a below-shown relation:

$\varepsilon_{m1} - \varepsilon_{m2} \ge 1.5$.

6. The laminated glass according to claim 3, wherein the second interlayer film comprises at least one material selected from the group consisting of polyvinyl butyral, ethylene vinyl acetate, a cycloolefin polymer, an urethane resin, a fluorine resin, a fluoro-rubber, a polyimide resin, a liquid-crystal polymer, a bismaleimide triazine resin, a polyphenylene ether, a polyether terephthalate, an acrylic resin such as a polymethyl methacrylate resin, a silicone resin, an ABS resin, $Al_2O_3$, and $SiO_2$.

7. The laminated glass according to claim 1, wherein the relative dielectric constants $\varepsilon_{g1}$, $\varepsilon_{g2}$ and $\varepsilon_{m1}$ satisfy below-shown relations:

$\varepsilon_{g1} - \varepsilon_{m1} \leq 3.5$; and $\varepsilon_{g2} - \varepsilon_{m1} \leq 3.5$.

8. The laminated glass according to claim 1, wherein a transmittance of the first interlayer film for visible light is 70% or higher.

9. The laminated glass according to claim 1, wherein when an electromagnetic wave having the frequency F is incident on the first glass plate at an incident angle θ no smaller than 30° and no larger than 90° (30°≤θ≤90°), the relative dielectric constant $\varepsilon_{m1}$ of the first interlayer film satisfies a relation $3 \leq \varepsilon_{m1} \leq 15$.

10. The laminated glass according to claim 1, wherein the frequency F is in a range of 70 GHz to 84 GHz.

11. The laminated glass according to claim 1, wherein the first interlayer film comprises $Al_2O_3$, and a volume content of $Al_2O_3$ is larger than 1.8 vol %.

12. The laminated glass according to claim 1, wherein the first interlayer film comprises $TiO_2$, and a volume content of $TiO_2$ is in a range of 0.15 vol % to 3.4 vol %.

13. The laminated glass according to claim 1, wherein the first interlayer film contains $SiO_2$, and a volume content of $SiO_2$ is 10 vol % or larger.

14. The laminated glass according to claim 1, wherein
the first interlayer film comprises a powdery glass, the powdery glass, when expressed by mol percentages based on oxides, satisfying:
$SiO_2$: 50%-85%
$B_2O_3$: 0%-35%
$Al_2O_3$: 0%-25%
$Li_2O+Na_2O+K_2O$: 0%-30%
MgO: 0%-15%
CaO: 0%-15%
SrO: 0%-15%
BaO: 0%-15%
$ZrO_2$: 0%-5%
$TiO_2$: 0%-10%
$Fe_2O_3$: 0%-5%
$SnO_2$: 0%-5%, and
a volume content of the powdery glass is not smaller than 1 vol % and not larger than 50 vol %.

15. The laminated glass according to claim 1, wherein the first interlayer film comprises powdery $BaTiO_3$, and a volume content of the $BaTiO_3$ is not smaller than 1 vol % and not larger than 50 vol %.

\* \* \* \* \*